US008634486B2

(12) United States Patent
Ikegaya et al.

(10) Patent No.: US 8,634,486 B2
(45) Date of Patent: Jan. 21, 2014

(54) SIGNAL RECEIVING APPARATUS, SIGNAL RECEIVING METHOD AND SIGNAL RECEIVING PROGRAM

(75) Inventors: Ryoji Ikegaya, Kanagawa (JP);
Hidetoshi Kawauchi, Kanagawa (JP);
Suguru Houchi, Tokyo (JP); Naoki Yoshimochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 241 days.

(21) Appl. No.: 13/235,917

(22) Filed: Sep. 19, 2011

(65) Prior Publication Data

US 2012/0099677 A1    Apr. 26, 2012

(30) Foreign Application Priority Data

Oct. 20, 2010 (JP) .................................. 2010-235148

(51) Int. Cl.
*H04K 1/10* (2006.01)
*H04L 27/28* (2006.01)

(52) U.S. Cl.
USPC ........... 375/260; 375/340; 375/316; 375/222; 711/5; 708/403; 708/404; 708/405

(58) Field of Classification Search
USPC .......... 375/340, 260, 316, 222; 708/403–409; 711/5
See application file for complete search history.

(56) References Cited

U.S. PATENT DOCUMENTS

| 6,122,703 | A * | 9/2000 | Nasserbakht | 711/5 |
| 6,563,865 | B1 * | 5/2003 | Usui | 375/222 |
| 8,126,953 | B2 * | 2/2012 | Shih | 708/404 |

FOREIGN PATENT DOCUMENTS

JP    2009-164746    7/2009

OTHER PUBLICATIONS

U.S. Appl. No. 13/242,754, filed Sep. 23, 2011, Yoshimochi, et al.
U.S. Appl. No. 13/235,816, filed Sep. 19, 2011, Yoshimochi, et al.
U.S. Appl. No. 13/235,864, filed Sep. 19, 2011, Yoshimochi, et al.
U.S. Appl. No. 13/236,005, filed Sep. 19, 2011, Kawauchi, et al.
U.S. Appl. No. 13/236,706, filed Sep. 20, 2011, Yokokawa, et al.

* cited by examiner

*Primary Examiner* — Phuong Phu
(74) *Attorney, Agent, or Firm* — Sony Corporation

(57) ABSTRACT

A signal receiving apparatus includes: a processing unit configured to carry out Fourier transform on Fourier-transform data serving as a Fourier-transform object and carry out Fourier transform on inverse-Fourier-transform data serving as an inverse-Fourier-transform object; and a control unit configured to output pieces of data obtained as a result of the Fourier transform carried out on the Fourier-transform data in an order, in which the pieces of data have been obtained, in a process of outputting the pieces of data and output other pieces of data obtained as a result of the Fourier transform carried out on the inverse-Fourier transform data by rearranging the other pieces of data in a process of outputting the other pieces of data.

8 Claims, 19 Drawing Sheets

SIGNAL RECEIVING APPARATUS, SIGNAL RECEIVING METHOD AND SIGNAL RECEIVING PROGRAM

BACKGROUND

The present disclosure relates to a signal receiving apparatus, a signal receiving method and a signal receiving program. More particularly, the present disclosure relates to a signal receiving apparatus having a small circuit scale for a case in which Fourier-transform results and inverse-Fourier-transform results are demanded in signal processing carried out by the apparatus, and relates to a signal receiving method adopted by the apparatus as well as a signal receiving program implementing the method.

As a modulation method of the ground digital broadcasting, an OFDM (Orthogonal Frequency Division Multiplexing) method is adopted. The OFDM method is a method for modulating each of a number of orthogonal carrier waves by adoption of a PSK (Phase Shift Keying) technique or a QAM (Quadrature Amplitude Modulation) technique. In a signal receiving apparatus for receiving a broadcast signal obtained as a result of modulation carried out by adoption of typically the OFDM method, Fourier-transform processing and inverse-Fourier-transform processing are carried out in order to demodulate data conveyed by the signal.

FIG. 1 is a block diagram showing a demodulation section 1 employed in the existing signal receiving apparatus.

As shown in FIG. 1, the demodulation section 1 is configured to include a Fourier-transform processing block 11, a signal division block 12, a noise detection block 13, an inverse-Fourier-transform processing block 14, a channel inference block 15 and a Fourier-transform processing block 16. In the existing signal receiving apparatus, an IF (Intermediate Frequency) signal is subjected to an orthogonal demodulation process carried out by making use of a carrier signal having a frequency determined in advance. A baseband OFDM signal obtained as a result of the orthogonal demodulation process is then supplied to the Fourier-transform processing block 11.

The OFDM signal supplied to the Fourier-transform processing block 11 is a time-domain signal prior to execution of FFT (Fast Fourier Transform) processing. As a result of the orthogonal demodulation process carried out by the existing signal receiving apparatus, the OFDM time-domain signal supplied to the Fourier-transform processing block 11 is changed to a signal having a real-axis component referred to as an I signal and an imaginary-axis component referred to as a Q signal. That is to say, as a result of the orthogonal demodulation process, the OFDM time-domain signal supplied to the Fourier-transform processing block 11 becomes a signal which is a combination of data transmitted by a signal transmitting apparatus and an impulse response representing a channel state.

The Fourier-transform processing block 11 is a block for carrying out Fourier transform on the OFDM time-region signal in order to produce a signal representing a result of the Fourier transform. The signal output by the Fourier-transform processing block 11 to the signal division block 12 is a frequency-domain signal obtained as a result of the Fourier transform.

The signal division block 12 is a block for dividing the frequency-domain signal received from the Fourier-transform processing block 11 by a signal received from the Fourier-transform processing block 16 in order to get rid of distortion components of the channel. The signal division block 12 supplies the frequency-domain signal obtained as a result of the division process carried out by the signal division block 12 in order to get rid of the distortion components to the noise detection block 13 and sections provided at the later stage following the demodulation section 1. The sections provided at the later stage following the demodulation section 1 include an error correction section.

The noise detection block 13 is a block for detecting noise components included in the frequency-domain signal received from the signal division block 12 and outputting a signal representing the result of the noise-component detection to the inverse-Fourier-transform processing block 14.

The inverse-Fourier-transform processing block 14 is a block for carrying out inverse Fourier transform on the frequency-domain signal received from the noise detection block 13 and outputting a signal representing the result of the inverse Fourier transform to the channel inference block 15. The signal output by the inverse-Fourier-transform processing block 14 is a time-domain signal.

The channel inference block 15 is a block for inferring the state of the channel on the basis of the time-domain signal received from the inverse-Fourier-transform processing block 14 and outputting a time-domain signal representing the result of the inference to the Fourier-transform processing block 16. As the result of the processing to infer the state of the channel, the channel inference block 15 outputs the time-domain signal representing the positions of a main path, a pre-echo and a post-echo which are included in a segment determined in advance.

The Fourier-transform processing block 16 is a block for carrying out Fourier transform on the time-domain signal received from the channel inference block 15 and outputting a frequency-domain signal representing the result of the Fourier transform to the signal division block 12.

As described above, in the demodulation section 1, in order to equalize the signal output by the Fourier-transform processing block 11, the inverse-Fourier-transform processing block 14 carries out the inverse Fourier transform whereas the Fourier-transform processing block 16 carries out the Fourier transform.

FIG. 2 is a block diagram showing the configuration of the Fourier-transform processing block 16 employed in the demodulation section 1 shown in FIG. 1.

As shown in FIG. 2, the Fourier-transform processing block 16 is configured to include a control unit 21, an input memory 22, a Fourier-transform execution unit 23 and an output memory 24. The Fourier-transform processing block 16 receives pieces of data represented by the time-domain signal output from the channel inference block 15 as data to serve as an object of the Fourier transform.

The Fourier-transform data x (n) is stored at an address n in the input memory 22. In this case, n denotes a point of time. n=0 indicates a point of time at which the first Fourier-transform data x (0) is stored. The control unit 21 specifies the address n at which Fourier-transform data x (n) is stored.

N is a data count which is the number of pieces of data to serve as an object of the Fourier transform. When N pieces of data to serve as an object of the Fourier transform have been stored in the input memory 22, the Fourier-transform execution unit 23 carries out the Fourier transform on the data. The Fourier transform carried out by the Fourier-transform execution unit 23 is represented by Eq. (1) given as follows.

$$X(k) = \sum_{n=0}^{N-1} x(n)e^{-j2\pi\frac{nk}{N}} \quad (1)$$

In Eq. (1), notation j denotes the imaginary-number unit. x (n), where n=0, 1, . . . and (N−1), denotes Fourier-transform data stored in the input memory 22. X (k), where k=0, 1, . . . and (N−1), denotes results of the Fourier transform. It is to be noted that, depending on the data count N, Eq. (1) can be modified to a simple equation representing simple Fourier transform. However, explanation of the simple equation and the simple Fourier transform is omitted.

N results X (k) of the Fourier transform carried out by the Fourier-transform execution unit 23 are stored at addresses k in the output memory 24. The addresses k are also specified by the control unit 21.

After all the N results X (k) of the Fourier transform have been stored at respectively addresses 0 to (N−1) in the output memory 24, the N results X (k) are read out sequentially from the addresses 0 to (N−1). The address from which a result of the Fourier transform is read out from the output memory 24 is also specified by the control unit 21. To put it concretely, the results X (0), X (1), . . . and X (N−1) are read out from the output memory 24 in the frequency-index order.

FIG. 3 is a block diagram showing the configuration of the inverse-Fourier-transform processing block 14 employed in the demodulation section 1 shown in FIG. 1.

As shown in FIG. 3, the inverse-Fourier-transform processing block 14 is configured to include a control unit 31, an input memory 32, an inverse-Fourier-transform execution unit 33 and an output memory 34. The inverse-Fourier-transform processing block 14 receives pieces of data represented by the frequency-domain signal output from the noise detection block 13 as data to serve as an object of the inverse Fourier transform.

The inverse-Fourier-transform data Y (k) is stored at an address k in the input memory 32. In this case, k denotes a frequency index. k=0 indicates the frequency index of the first inverse-Fourier-transform data Y (0). The control unit 31 specifies the address k at which inverse-Fourier-transform data Y (k) is stored.

N is a data count which is the number of pieces of data to serve as an object of the inverse Fourier transform. When N pieces of data to serve as an object of the inverse Fourier transform have been stored in the input memory 32, the inverse-Fourier-transform execution unit 33 carries out the inverse Fourier transform on the data. The inverse Fourier transform carried out by the inverse-Fourier-transform execution unit 33 is represented by Eq. (2) given as follows.

$$y(n) = \sum_{k=0}^{N-1} Y(k)e^{j2\pi\frac{nk}{N}} \quad (2)$$

In Eq. (2), notation j denotes the imaginary-number unit. Y (k), where k=0, 1, . . . and N−1, denotes inverse-Fourier-transform data stored in the input memory 32. y (n), where n=0, 1, . . . and N−1, denotes results of the inverse Fourier transform. It is to be noted that, depending on the data count N, Eq. (2) can be modified to a simple equation representing simple inverse Fourier transform. However, explanation of the simple equation and the simple inverse Fourier transform is omitted.

N results y (n) of the inverse Fourier transform carried out by the inverse-Fourier-transform execution unit 33 are stored at addresses n in the output memory 34. The addresses n are also specified by the control unit 31.

After all the N results y (n) of the inverse Fourier transform have been stored at respectively addresses 0 to (N−1) in the output memory 34, the N results y (n) are read out sequentially from the addresses 0 to (N−1). The address from which a result of the inverse Fourier transform is read out from the output memory 34 is also specified by the control unit 31. To put it concretely, the results y (0), y (1), and y (N−1) are read out sequentially from the output memory 24.

For more information, the reader is suggested to refer to Japanese Patent Laid-Open No. 2009-164746.

SUMMARY

The demodulation section employed in the existing signal receiving apparatus has a Fourier-transform processing section and an inverse-Fourier-transform processing section which are separated from each other. A Fourier-transform execution unit employed in the Fourier-transform processing block needs a memory with a relatively large storage capacity for execution of Fourier transform. By the same token, an inverse-Fourier-transform execution unit employed in the inverse-Fourier-transform processing block also needs a memory with a relatively large storage capacity for execution of inverse Fourier transform. Thus, with such a Fourier-transform processing section and such an inverse-Fourier-transform processing section which are separated from each other, the increase of the circuit scale of the demodulation section cannot be ignored.

It is therefore an embodiment of the present disclosure addressing the problem described above to reduce the circuit scale of a demodulation section in which Fourier-transform results and inverse-Fourier-transform results are demanded in signal processing carried out by the demodulation section.

A signal receiving apparatus includes:

a processing unit configured to carry out Fourier transform on Fourier-transform data serving as a Fourier-transform object and carry out Fourier transform on inverse-Fourier-transform data serving as an inverse-Fourier-transform object; and a control unit configured to output pieces of data obtained as a result of the Fourier transform carried out on the Fourier-transform data in an order, in which the pieces of data have been obtained, in a process of outputting the pieces of data and output other pieces of data obtained as a result of the Fourier transform carried out on the inverse-Fourier transform data by rearranging the other pieces of data in a process of outputting the other pieces of data.

The signal receiving apparatus wherein the control unit outputs the mth piece of data obtained as a result of the Fourier transform carried out on the Fourier-transform data as an mth piece of data of a Fourier-transform result composed of the pieces of data and outputs the (N−m)th other piece of data obtained as a result of the Fourier transform carried out on the inverse-Fourier-transform data as an mth piece of data of an inverse-Fourier-transform result composed of the other pieces of data where N is the number of points of the Fourier transform carried out by the processing unit and m is an integer having the following value: m=0, 1, . . . , (N−1).

The signal receiving apparatus, the signal receiving apparatus further includes:

an input storage unit configured to store one of the Fourier-transform data and the inverse-Fourier-transform data; and an output storage unit configured to store one of data obtained as a result of the Fourier transform carried out on the Fourier-transform data stored in the input storage unit and data obtained as a-result of the Fourier transform carried out on the inverse-Fourier-transform data stored in the input storage unit, wherein the control unit outputs the data stored in the output storage unit.

The signal receiving apparatus, the signal receiving apparatus further includes:

a first input storage unit configured to store the Fourier-transform data;

a second input storage unit configured to store the inverse-Fourier-transform data;

a first output storage unit configured to store data obtained as a result of the Fourier transform carried out on the Fourier-transform data stored in the first input storage unit; and a second output storage unit configured to store data obtained as a result of the Fourier transform carried out on the inverse-Fourier-transform data stored in the second input storage unit, wherein the control unit outputs the data stored in one of the first output storage unit and the second output storage unit.

The signal receiving apparatus, the signal receiving apparatus further includes:

a first input storage unit configured to store the Fourier-transform data;

a second input storage unit configured to store the inverse-Fourier-transform data; and an output storage unit configured to store one of data obtained as a result of the Fourier transform carried out on the Fourier-transform data stored in the first input storage unit and store data obtained as a result of the Fourier transform carried out on the inverse-Fourier-transform data stored in the second input storage unit, wherein the control unit outputs the data stored in the output storage unit.

The signal receiving apparatus, the signal receiving apparatus further includes:

an input storage unit configured to store one of the Fourier-transform data and the inverse-Fourier-transform data;

a first output storage unit configured to store data obtained as a result of the Fourier transform carried out on the Fourier-transform data stored in the input storage unit; and a second output storage unit configured to store data obtained as a result of the Fourier transform carried out on the inverse-Fourier-transform data stored in the input storage unit, wherein the control unit outputs the data stored in one of the first output storage unit and the second output storage unit.

The signal receiving apparatus, the signal receiving apparatus further includes:

a storage unit configured to store data selected from the Fourier-transform data, the inverse-Fourier-transform data, data obtained as a result of the Fourier transform carried out on the Fourier-transform data, and data obtained as a result of the Fourier transform carried out on the inverse-Fourier-transform data; and a select unit configured to select one of the Fourier-transform data and the inverse-Fourier-transform data when receiving the Fourier-transform data and the inverse-Fourier-transform data and to store one of the selected Fourier-transform data and the selected inverse-Fourier-transform data in the storage unit, and to select one of the data obtained as a result of the Fourier transform carried out by the processing unit on the Fourier-transform data stored in the storage unit and the data obtained as a result of the Fourier transform carried out by the processing unit on the inverse-Fourier-transform data stored in the storage unit when receiving the data obtained as a result of the Fourier transform carried out on the Fourier-transform data and the data obtained as a result of the Fourier transform carried out on the inverse-Fourier-transform data and to store one of the selected data obtained as a result of the Fourier transform carried out on the Fourier-transform data and the selected data obtained as a result of the Fourier transform carried out on the inverse-Fourier-transform data in the storage unit, wherein the control unit outputs one of the data obtained as a result of the Fourier transform carried out on the Fourier-transform data and the data obtained as a result of the Fourier transform carried out on the inverse-Fourier-transform data by reading out the data to be output from the storage unit.

A signal receiving method includes:

carrying out Fourier transform on Fourier-transform data serving as a Fourier-transform object and carrying out Fourier transform on inverse-Fourier-transform data serving as an inverse-Fourier-transform object; and outputting pieces of data obtained as a result of the Fourier transform carried out on the Fourier-transform data in an order, in which the pieces of data have been obtained, in a process of outputting the pieces of data and outputting other pieces of data obtained as a result of the Fourier transform carried out on the inverse-Fourier transform data by rearranging the other pieces of data in a process of outputting the other pieces of data.

A signal receiving program to be executed by a computer to perform processing includes:

carrying out Fourier transform on Fourier-transform data serving as a Fourier-transform object and carrying out Fourier transform on inverse-Fourier-transform data serving as an inverse-Fourier-transform object; and outputting pieces of data obtained as a result of the Fourier transform carried out on the Fourier-transform data in an order, in which the pieces of data have been obtained, in a process of outputting the pieces of data and outputting other pieces of data obtained as a result of the Fourier transform carried out on the inverse-Fourier transform data by rearranging the other pieces of data in a process of outputting the other pieces of data.

In the aforementioned embodiments of the present disclosure, Fourier transform is carried out on Fourier-transform data serving as a Fourier-transform object whereas other Fourier transform is carried out on inverse-Fourier-transform data serving as an inverse-Fourier-transform object. In addition, pieces of data obtained as a result of the Fourier transform carried out on the Fourier-transform data serving as a Fourier-transform object are output in an order, in which the pieces of data have been obtained, in a process of outputting the pieces of data. On top of that, other pieces of data obtained as a result of the Fourier transform carried out on the inverse-Fourier transform data serving as an inverse-Fourier transform object are output by rearranging the other pieces of data in a process of outputting the other pieces of data.

In accordance with the present disclosure, the circuit scale of the signal receiving apparatus can be reduced for a case in which Fourier-transform results and inverse-Fourier-transform results are demanded in signal processing carried out by the apparatus.

DETAILED DESCRIPTION OF THE PREFERRED EMBODIMENTS

Typical Configuration of a Signal Receiving Apparatus

Figure 4:
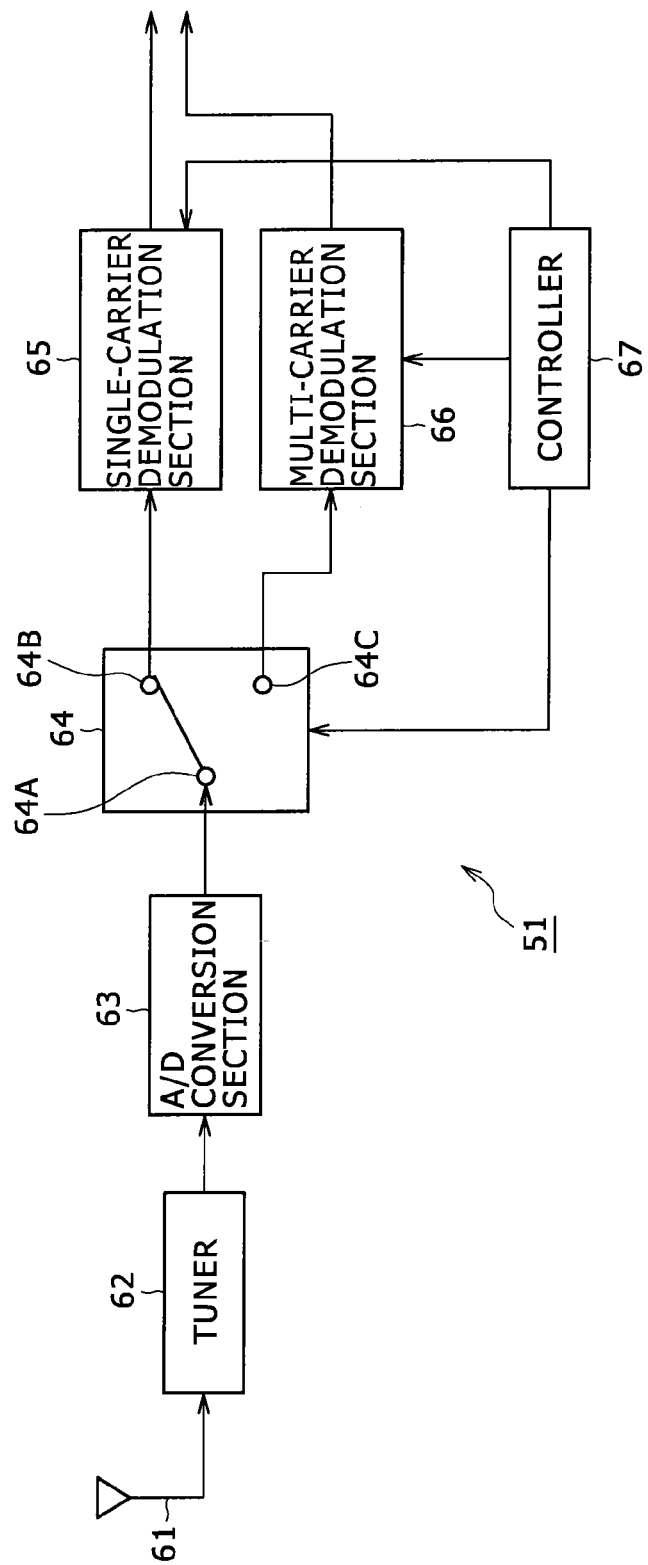
FIG. 4 is a block diagram showing a typical configuration of a signal receiving apparatus according to an embodiment of the present disclosure.

FIG. 4 is a block diagram showing a typical configuration of a signal receiving apparatus 51 according to an embodiment of the present disclosure.

As shown in the figure, the signal receiving apparatus 51 is configured to include an antenna 61, a tuner 62, an A/D conversion section 63, a switch section 64, a single-carrier demodulation section 65, a multi-carrier demodulation section 66 and a controller 67. A typical example of the signal receiving apparatus 51 is a signal receiving apparatus conforming to the DTMB (Digital Terrestrial Multimedia Broadcast) specifications provided for the ground digital broadcasting.

In accordance with the DTMB specifications, as a data modulation method, it is possible to select either a single-carrier modulation method or a multi-carrier modulation method. A signal receiving apparatus conforming to the DTMB specifications is provided with a function for demodulating data modulated by adoption of the single-carrier modulation method before being transmitted to the apparatus as well as a function for demodulating data modulated by adoption of the multi-carrier modulation method before being transmitted to the apparatus.

The tuner 62 is a section for receiving an RF (Radio Frequency) signal and carrying out frequency conversion on the RF signal in order to generate an IF signal to be supplied to the A/D conversion section 63.

The A/D conversion section 63 is a section for carrying out A/D conversion on the IF signal, which is received from the tuner 62, in order to generate digital data to be supplied to the switch section 64.

The switch section 64 is a section for determining a destination, to which the digital data received from the A/D conversion section 63 is to be passed on, in accordance with control carried out by the controller 67. To put it in detail, in processing carried out by the signal receiving apparatus 51 to demodulate a signal modulated by adoption of the single-carrier modulation method and transmitted to the signal receiving apparatus 51, the switch section 64 connects an input terminal 64A to an output terminal 64B in order to pass on the digital data received from the A/D conversion section 63 to the single-carrier demodulation section 65. In processing carried out by the signal receiving apparatus 51 to demodulate a signal modulated by adoption of the multi-carrier modulation method and transmitted to the signal receiving apparatus 51, on the other hand, the switch section 64 connects the input terminal 64A to an output terminal 64C in order to pass on the digital data received from the A/D conversion section 63 to the multi-carrier demodulation section 66.

The single-carrier demodulation section 65 is a section for demodulating the digital data received from the switch section 64 in accordance with control carried out by the controller 67 in order to generate output data.

The multi-carrier demodulation section 66 is a section for demodulating the digital data received from the switch section 64 in accordance with control carried out by the controller 67 in order to generate output data. If the OFDM method is adopted as the multi-carrier modulation method, a baseband OFDM signal is supplied to the multi-carrier demodulation section 66. The baseband OFDM signal is a signal obtained as a result of orthogonal demodulation carried out by a processing section not shown in the figure on the digital data output by the A/D conversion section 63.

Data obtained as a result of the demodulation carried out by the single-carrier demodulation section 65 or the multi-carrier demodulation section 66 is supplied to typically a processing section provided at the following stage. The processing section provided at the following stage then carries out processing such as error correction on the data.

The controller 67 is a section for controlling the whole operations of the signal receiving apparatus 51 by executing a program determined in advance. For example, the controller 67 controls the switch section 64 in order to determine a destination, to which the digital data received by the switch section 64 from the A/D conversion section 63 is to be passed on, in accordance with whether the modulation method adopted by the channel receiving a signal is the single-carrier modulation method or the multi-carrier modulation method. In addition, the controller 67 also supplies a Fourier-transform operation flag to the multi-carrier demodulation section 66. The Fourier-transform operation flag is a flag indicating the substance of processing to be carried out by the multi-carrier demodulation section 66.

Figure 5:
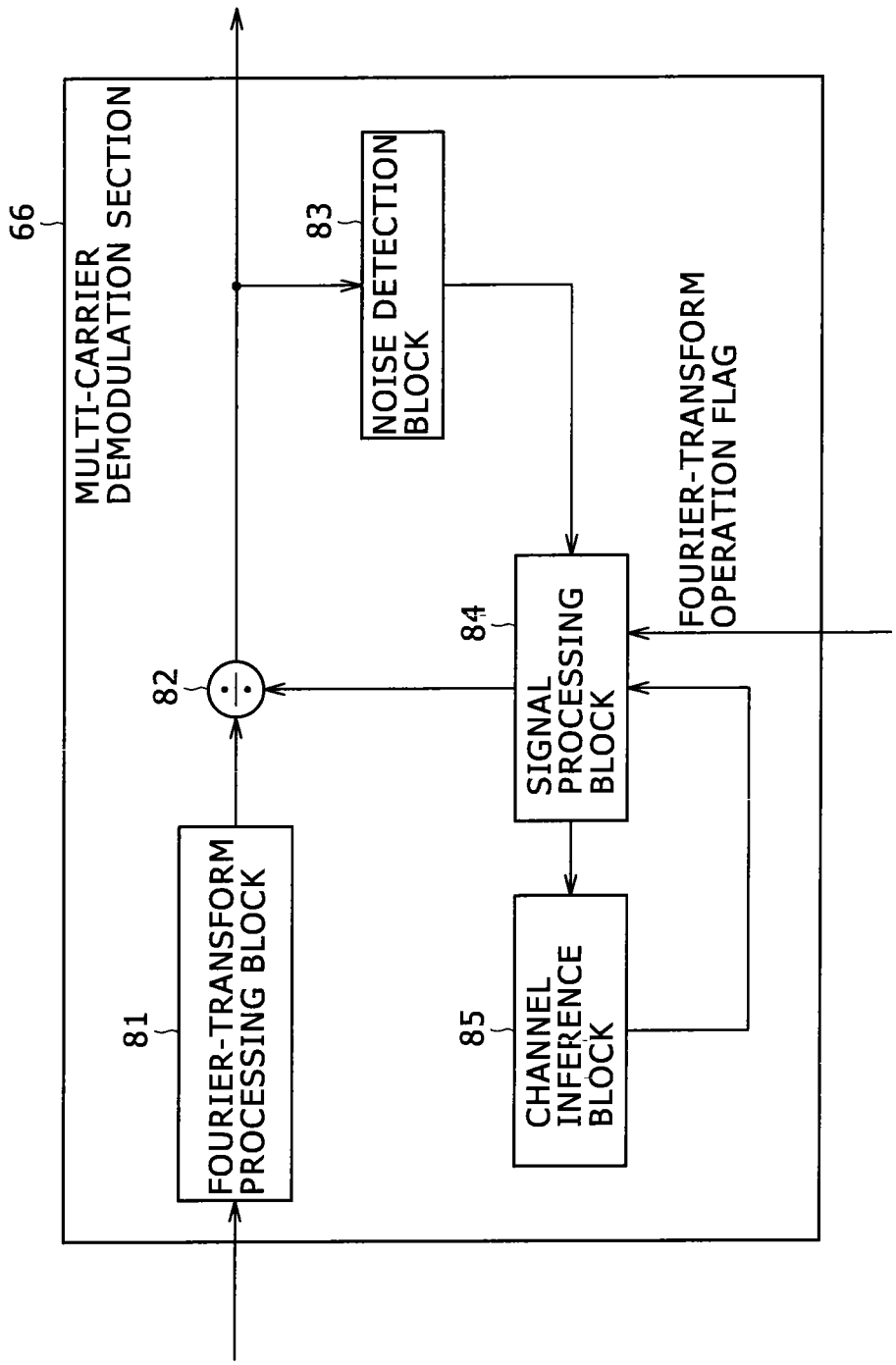
FIG. 5 is a block diagram showing a typical configuration of a multi-carrier demodulation section employed in the signal receiving apparatus shown in FIG. 4.

FIG. 5 is a block diagram showing a typical configuration of the multi-carrier demodulation section 66 employed in the signal receiving apparatus 51 shown in FIG. 4.

As shown in FIG. 5, the multi-carrier demodulation section 66 is configured to include a Fourier-transform processing block 81, a signal division block 82, a noise detection block 83, a signal processing block 84 and a channel inference block 85. The multi-carrier demodulation section 66 does not have a Fourier-transform processing block and an inverse-Fourier-transform processing block which are separated from each other. Instead, the multi-carrier demodulation section 66 is provided with the signal processing block 84 having a configuration including units common to the Fourier-transform processing section and the inverse-Fourier-transform processing section or a configuration including all portions common to the Fourier-transform processing section and the inverse-Fourier-transform processing section except the control unit.

The Fourier-transform processing block 81 receives an OFDM signal which is a baseband time-domain signal obtained as a result of orthogonal demodulation whereas the signal processing block 84 receives the Fourier-transform operation flag from the controller 67. The signal supplied to the Fourier-transform processing block 81 is a combination of data transmitted by a signal transmitting apparatus and an impulse response representing a channel state.

The Fourier-transform processing block 81 carries out Fourier-transform processing on the OFDM time-domain signal and outputs a signal representing the result of the Fourier-transform processing to the signal division block 82. The signal output by the Fourier-transform processing block 81 is a post-FFT-processing frequency-domain signal.

The signal division block 82 divides the frequency-domain signal received from the Fourier-transform processing block 81 by a signal received from the signal processing block 84 in order to eliminate distortion components of the channel. The signal division block 82 supplies a frequency-domain signal obtained as a result of the division to the noise detection block 83 and sections provided at a stage following the multi-carrier demodulation section 66. The sections provided at a stage following the multi-carrier demodulation section 66 include an error correction section.

The noise detection block 83 detects noise components included in the frequency-domain signal received from the signal division block 82 and outputs a frequency-domain signal representing the result of the noise detection to the signal processing block 84.

The signal processing block 84 carries out inverse-Fourier transform on the frequency-domain signal received from the noise detection block 83 and outputs a signal representing the result of the inverse-Fourier-transform processing to the channel inference block 85. The signal output by the signal processing block 84 to the channel inference block 85 is a time-domain signal. In addition, the signal processing block 84 also carries out Fourier transform on a time-domain signal received from the channel inference block 85 and outputs a frequency-domain signal representing the result of the Fourier-transform processing to the signal division block 82.

The Fourier-transform processing carried out by the signal processing block 84 is processing of performing Fourier transform on data received as Fourier-transform data and outputting data of the Fourier-transform result. On the other hand, the inverse-Fourier-transform processing carried out by the signal processing block 84 is processing of performing Fourier transform on data received as inverse-Fourier-transform data and outputting data of the inverse-Fourier-transform result.

The channel inference block 85 infers the state of the channel on the basis of the time-domain signal received from the signal processing block 84 and outputs a signal representing the result of the inference to the signal processing block 84. The signal output by the channel inference block 85 as a signal representing the inference result indicating the state of the channel is a time-domain signal representing the positions of a main path, a pre-echo and a post-echo which are included in a segment determined in advance.

The following description explains typical configurations of the signal processing block 84 and operations carried out by the signal processing block 84. In each of the typical configurations, the number of pieces of input data is two. The two pieces of input data are Fourier-transform data and inverse-Fourier-transform data respectively. However, the number of pieces of input data is by no means limited to two.

First Typical Configuration

Figure 6:
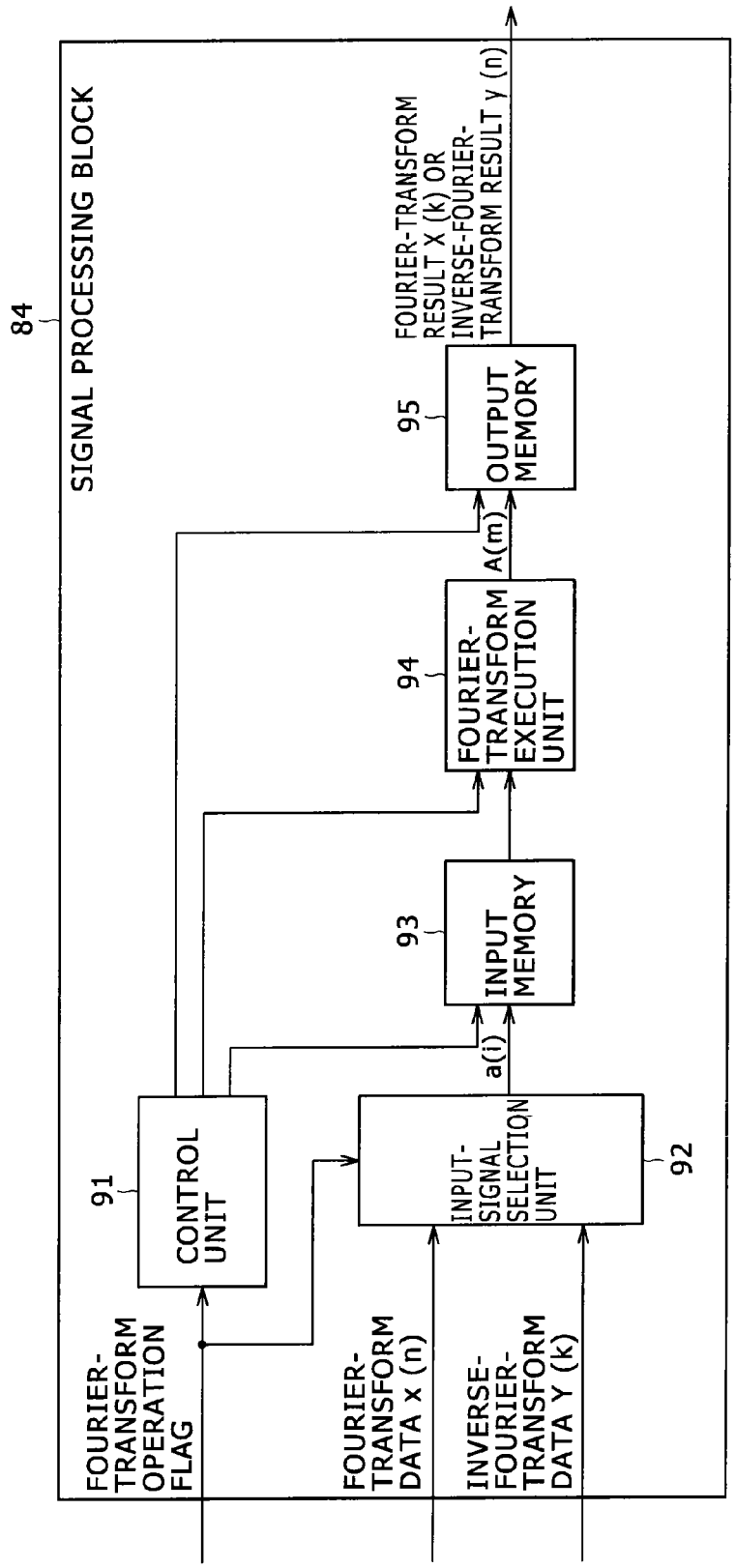
FIG. 6 is a block diagram showing a first typical configuration of a signal processing block employed in the multi-carrier demodulation section shown in FIG. 5.

FIG. 6 is a block diagram showing a first typical configuration of the signal processing block 84 employed in the multi-carrier demodulation section 66 shown in FIG. 5.

Figure 1:
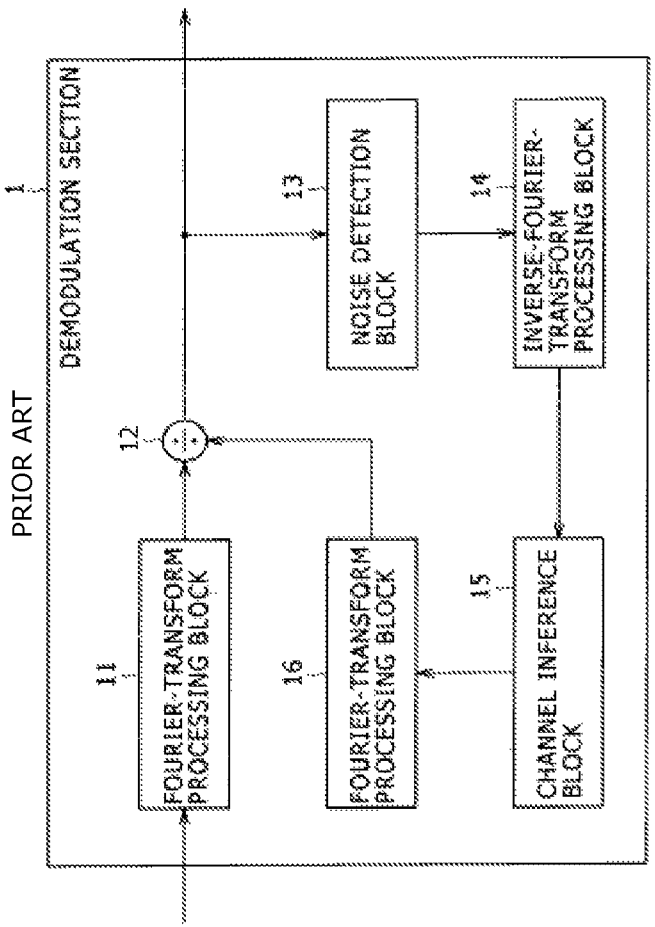
FIG. 1 is a block diagram showing a demodulation section employed in the existing signal receiving apparatus.
Figure 2:
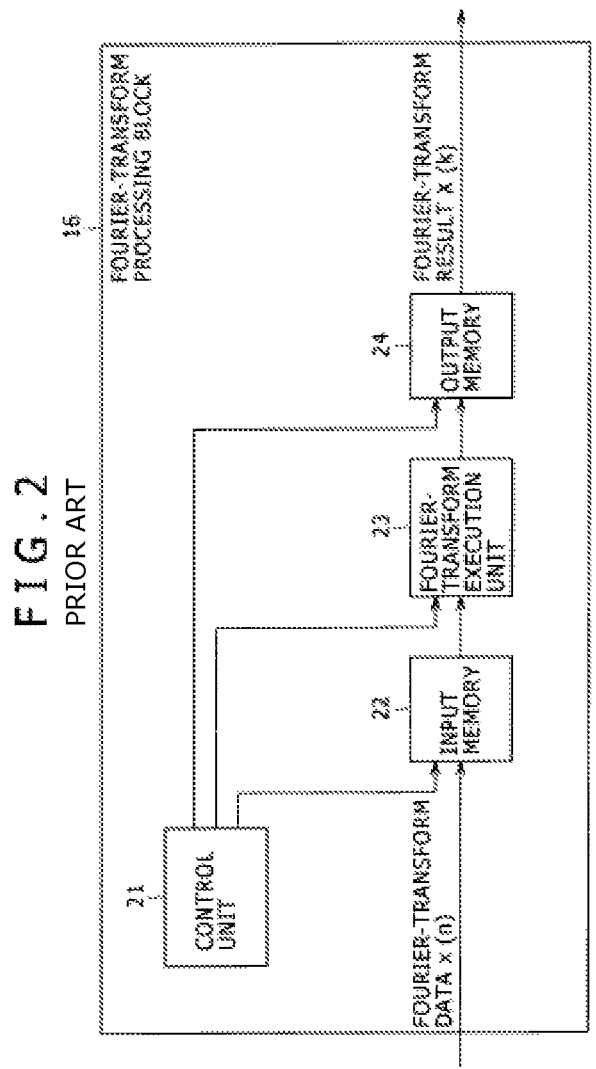
FIG. 2 is a block diagram showing the configuration of a Fourier transform block employed in the demodulation section shown in FIG. 1.
Figure 3:
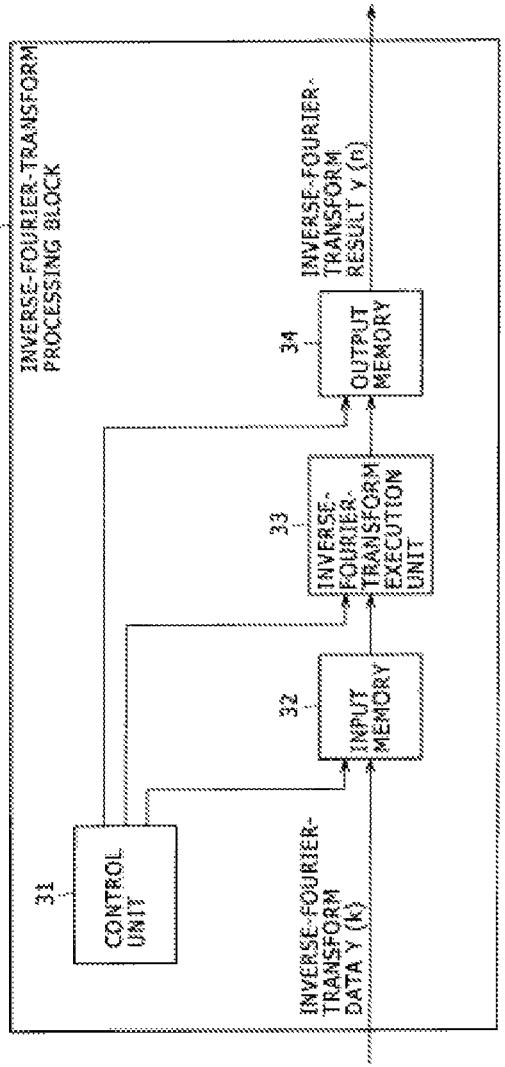
FIG. 3 is a block diagram showing the configuration of an inverse-Fourier transform block employed in the demodulation section shown in FIG. 1.

As explained earlier by referring to FIGS. 2 and 3, the Fourier-transform processing block 16 employs the control unit 21, the input memory 22, the Fourier-transform execution unit 23 and the output memory 24 whereas the inverse-Fourier-transform processing block 14 employs the control unit 31, the input memory 32, the inverse-Fourier-transform execution unit 33 and the output memory 34. That is to say, except the configuration of the control unit 91, the configurations of all sections employed in the signal processing block 84 are identical with the configurations of the corresponding sections employed in the inverse-Fourier-transform processing block 14 and the Fourier-transform processing block 16. Because of these three combinations, the signal processing block 84 is capable of carrying out the functions of both the Fourier-transform processing block 16 and the inverse-Fourier-transform processing block 14.

As shown in FIG. 6, in addition to the control unit 91, the input memory 93, the Fourier-transform execution unit 94 and the output memory 95, the signal processing block 84 is configured to include also an input-signal selection unit 92. The input-signal selection unit 92 receives Fourier-transform data which is data represented by the time-domain signal output by the channel inference block 85. In addition, the input-signal selection unit 92 also receives inverse-Fourier-transform data which is data represented by the frequency-domain signal output by the noise detection block 83. The Fourier-transform operation flag output by the controller 67 is supplied to the control unit 91 and the input-signal selection unit 92.

The Fourier-transform operation flag is set at an H or L level. The Fourier-transform operation flag set at the H level indicates that, since Fourier-transform data is supplied, Fourier transform is requested as processing to be carried out by the Fourier-transform execution unit 94 on the data. On the other hand, the Fourier-transform operation flag set at the L level indicates that, since inverse-Fourier-transform data is supplied, inverse Fourier transform is requested as processing to be carried out by the Fourier-transform execution unit 94 on the data. The point count of the Fourier transform is N. The point count of the Fourier transform is the number of pieces of data to serve as an object of the Fourier transform.

With the Fourier-transform operation flag set at the H level, the input-signal selection unit 92 selects the input Fourier-transform data x (n), where n=0, 1, . . . and (N−1), and outputs the selected data to the input memory 93 used for storing the data. In this case, notation n denotes a point of time and a point of time at which the first Fourier-transform data x (0) is received is expressed by the time n (=0).

With the Fourier-transform operation flag set at the L level, on the other hand, the input-signal selection unit 92 selects the input inverse-Fourier-transform data Y (k), where k=0, 1, . . . and (N−1), and outputs the selected data to the input memory 93 used for storing the data. In this case, notation k denotes a frequency index and a frequency index of the first inverse-Fourier-transform data Y (0) is received is expressed by the frequency index k (=0).

Let a (i), where i=0, 1, . . . and (N−1), denote pieces of data supplied by the input-signal selection unit 92 to the input memory 93. In this case, the data a (i) is expressed by Eq. (3) given as follows.

$$a(i) := \begin{cases} x(i) \text{ for Fourier-transform operation flag} = H \\ Y(i) \text{ for Fourier-transform operation flag} = L \end{cases} \quad (3)$$

The data a (i) output by the input-signal selection unit 92 is stored at an address i in the input memory 93. That is to say, the data a (i) output by the input-signal selection unit 92 is stored at a storage location pointed to by the address i as a location in the input memory 93. The address i is specified by the control unit 91.

When N pieces of data a (i) to serve as an object of the Fourier transform have been stored in the input memory 93, the Fourier-transform execution unit 94 carries out Fourier transform on the data a (i) stored in the input memory 93. The Fourier transform carried out by the Fourier-transform execution unit 94 is represented by Eq. (4) given as follows.

$$A(m) := \sum_{i=0}^{N-1} a(i) e^{-j2\pi \frac{mi}{N}} \quad (4)$$

In Eq. (4) given above, notation j denotes the imaginary-number unit whereas notation a (i) denotes the data stored in the input memory 93 as data to serve as an object of the Fourier transform. Notation A (m), where m=0, 1, 2, . . . and (N−1), denotes the result of the Fourier transform.

N Fourier-transform results A (m) output by the Fourier-transform execution unit 94 are stored at addresses m in the output memory 95. The addresses m are specified by the control unit 91.

The way in which data is read out from the output memory 95 is switched from one way to another in accordance with whether the Fourier-transform operation flag has been set at the H level to indicate that Fourier-transform processing is being carried out or the Fourier-transform operation flag has been set at the L level to indicate that inverse-Fourier-transform processing is being carried out.

The following description explains a relation between the Fourier transform and the inverse Fourier transform.

As described before, the Fourier transform is expressed by Eq. (4) where notation a (i) denotes input data. In addition, the inverse Fourier transform is expressed by Eq. (5) given below.

In Eq. (5), notation A' (m), where m=0, 1, . . . and (N−1), denotes results of the inverse Fourier transform.

$$A'(m) := \sum_{i=0}^{N-1} a(i) e^{j2\pi \frac{mi}{N}} \quad (5)$$

From Eqs. (4) and (5), Eq. (6) is derived as an equation representing a relation between the results A (m) of the Fourier transform carried out on the same data a (i) as the data serving as an object of the inverse Fourier transform and the results A' (m) of the inverse Fourier transform. It is to be noted that the following equation holds true: A' (N)=A (0).

$$\begin{aligned} A'(m) &:= \sum_{i=0}^{N-1} a(i) e^{j2\pi \frac{mi}{N}} \\ &= \sum_{i=0}^{N-1} a(i) e^{-j2\pi \frac{(-m)i}{N}} \\ &= \sum_{i=0}^{N-1} a(i) e^{-j2\pi \frac{(N-m)i}{N}} \\ &= A(N-m) \end{aligned} \quad (6)$$

Eq. (6) indicates that the mth data of the inverse-Fourier-transform result is equal to the (N−m)th data of the Fourier-transform result.

The following description again explains the operation to read out data from the output memory 95. With the Fourier-transform operation flag set at the H level, the Fourier-transform processing is carried out. In this case, a relation expressed by Eq. (7) given below holds true.

$$a(n) \text{ of Eq. (4)}=x(n) \text{ of Eq. (1)} \quad (7)$$

Thus, a relation expressed by Eq. (8) given below also holds true.

$$A(k) \text{ of Eq. (4)}=X(k) \text{ of Eq. (1)} \quad (8)$$

As is obvious from the above description, by reading out data from the output memory 95 in the following order: addresses 0, 1, . . . and (N−1), it is possible to read out the Fourier-transform results X (0), X (1), . . . and X (N−1) in the order of their enumeration.

With the Fourier-transform operation flag set at the L level, on the other hand, the inverse-Fourier-transform processing is carried out. In this case, a relation expressed by Eq. (9) given below holds true.

$$a(k) \text{ of Eq. (4)}=Y(k) \text{ of Eq. (2)} \quad (9)$$

In addition, if Eq. (6) given before is taken into consideration, Eq. (10) given below holds true.

$$A(0) \text{ of Eq. (4)}=y(0) \text{ of Eq. (2)}$$

$$A(N-n) \text{ of Eq. (4)}=y(n) \text{ of Eq. (2)} \quad (10)$$

As is obvious from the above description, by reading out data from the output memory 95 in the following order: addresses 0, (N−1), (N−2), . . . , 2 and 1, it is possible to read out the results of the Fourier transform as the inverse-Fourier-transform results y (0), y (1), and y (N−1) in the order of their enumeration.

As described above, in the signal processing block 84, there is a case in which it is necessary to output Fourier-transform results obtained by carrying out Fourier-transform processing in conformity with the Fourier-transform operation flag set at the H level and a case in which it is necessary to output inverse-Fourier-transform results obtained by carrying out inverse-Fourier-transform processing in conformity with the Fourier-transform operation flag set at the L level. In either of the cases, the processing itself is the Fourier transform. In the case where it is necessary to output inverse-Fourier-transform results, data obtained by carrying out the Fourier transform on inverse-Fourier-transform data serving as an inverse-Fourier-transform object is read out from the output memory 95 by changing the read order to read out the data from the output memory 95 and output in the order the data is read out from the output memory 95.

Next, processing carried out by the signal processing block 84 shown in FIG. 6 is explained by referring to a flowchart shown in FIG. 7 as follows.

Figure 7:
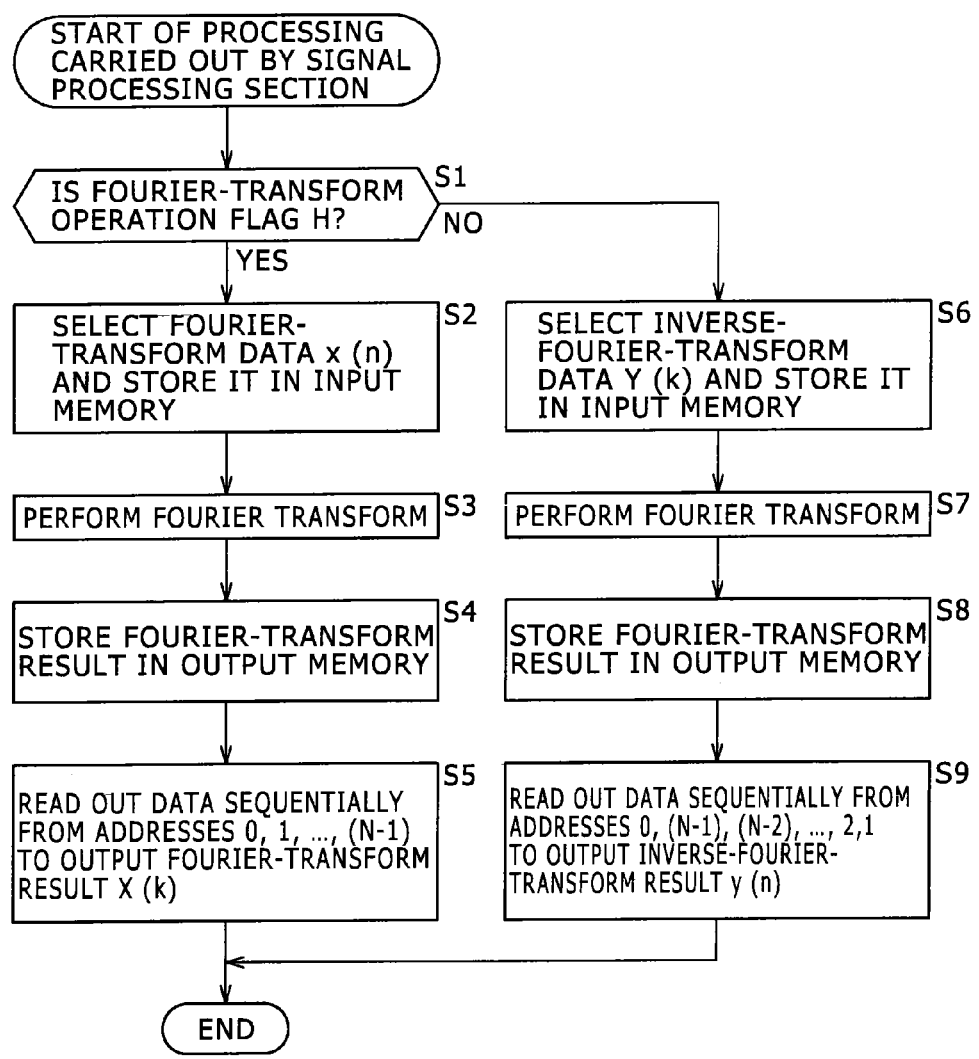
FIG. 7 shows an explanatory flowchart representing processing carried out by the signal processing block shown in FIG. 6.

The flowchart shown in FIG. 7 begins with a step S1 at which the input-signal selection unit 92 determines whether or not the Fourier-transform operation flag has been set at the H level.

If the input-signal selection unit 92 determines at the step S1 that the Fourier-transform operation flag has been set at the H level, the flow of the processing goes on to a step S2 at which the input-signal selection unit 92 selects input Fourier-transform data x (n). Then, the input-signal selection unit 92 stores (or writes) the Fourier-transform data x (n) in the input memory 93 in accordance with control carried out by the control unit 91.

Subsequently, at the next step S3, the Fourier-transform execution unit 94 carries out Fourier transform on the Fourier-transform data x (n) stored in the input memory 93.

Then, at the next step S4, the Fourier-transform execution unit 94 stores the results of the Fourier transform in the output memory 95 in accordance with control carried out by the control unit 91.

Subsequently, at the next step S5, the control unit 91 specifies read addresses 0, 1, . . . and (N−1) in their enumeration order and carries out control to sequentially read out the Fourier-transform results X (k) from the read addresses 0, 1, . . . and (N−1) in the output memory 95.

If the input-signal selection unit 92 determines at the step S1 that the Fourier-transform operation flag has been set at the L level, on the other hand, the flow of the processing goes on to a step S6 at which the input-signal selection unit 92 selects input inverse-Fourier-transform data Y (k). Then, the input-signal selection unit 92 stores the inverse-Fourier-transform data Y (k) in the input memory 93 in accordance with control carried out by the control unit 91.

Subsequently, at the next step S7, the Fourier-transform execution unit 94 carries out Fourier transform on the inverse-Fourier-transform data Y (k) stored in the input memory 93.

Then, at the next step S8, the Fourier-transform execution unit 94 stores the results of the Fourier transform in the output memory 95 as inverse-Fourier-transform results y (n) in accordance with control carried out by the control unit 91.

Subsequently, at the next step S9, the control unit 91 specifies read addresses 0, (N−1), (N−2), . . . , 2 and 1 in their enumeration order and carries out control to sequentially read out the results of the Fourier transform as the inverse-Fourier-transform results y (0), y (1), . . . and y (N−1) from the output memory 95. Then, after the inverse-Fourier-transform results y (n) have been output, the processing is finally terminated.

By carrying out the processing described above, Fourier-transform results X (k) can be read out from the output memory 95 when it is necessary to output the Fourier-transform results X (k) and inverse-Fourier-transform results y (n) can be read out from the output memory 95 when it is necessary to output the inverse-Fourier-transform results y (n). Thus, in comparison with a configuration in which the inverse-Fourier-transform processing block 14 and the Fourier-transform processing block 16 are provided separately from each other, the circuit scale of the signal processing block 84 can be reduced.

Second Typical Configuration

Figure 8:
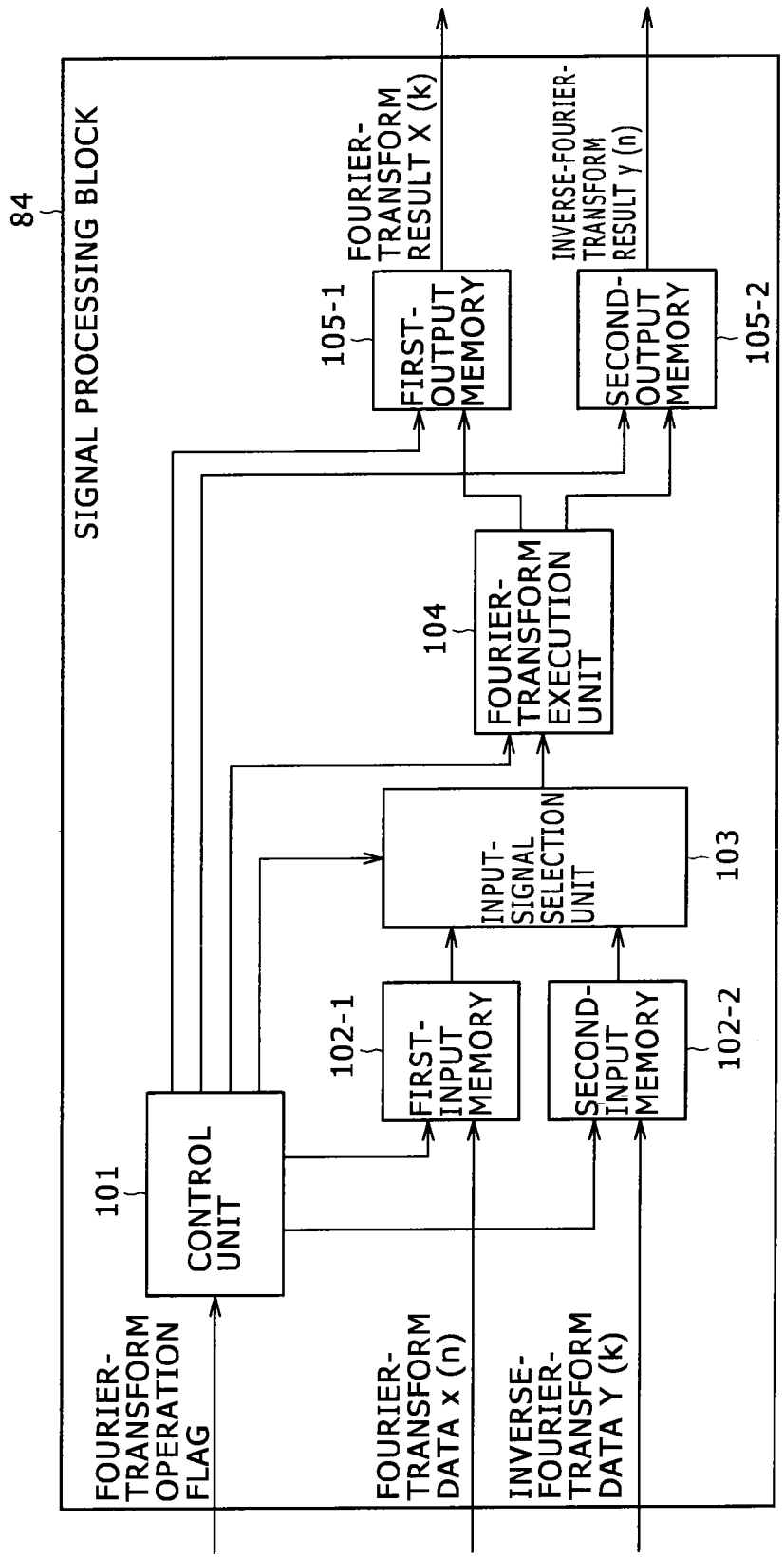
FIG. 8 is a block diagram showing a second typical configuration of the signal processing block.

FIG. 8 is a block diagram showing a second typical configuration of the signal processing block 84.

The second typical configuration shown in FIG. 8 is different from the first typical configuration shown in FIG. 6 in that, in the case of the second typical configuration, a first-input memory 102-1 used for storing input Fourier-transform data x (n) and a second-input memory 102-2 used for storing input inverse-Fourier-transform data Y (k) are provided in place of the input memory 93 employed in the first typical configuration. In addition, in the case of the second typical configuration, a first-output memory 105-1 used for storing Fourier-transform results X (k) of Fourier-transform processing and a second-output memory 105-2 used for storing inverse-Fourier-transform results y (n) of inverse-Fourier-transform processing are provided in place of the output memory 95 employed in the first typical configuration. The signal processing block 84 combines the inverse-Fourier-transform execution unit 33 of the inverse-Fourier-transform processing block 14 and the Fourier-transform execution unit 23 of the Fourier-transform processing block 16 into the Fourier-transform execution unit 104 so as to carry out the functions of both the inverse-Fourier-transform processing block 14 and the Fourier-transform processing block 16.

As shown in FIG. 8, the signal processing block 84 is configured to include a control unit 101, the first-input memory 102-1, the second-input memory 102-2, an input-signal selection unit 103, the Fourier-transform execution unit 104, the first-output memory 105-1 and the second-output memory 105-2. As described above, the first-input memory 102-1 is used for storing input Fourier-transform data x (n) represented by a time-domain signal output by the channel inference block 85. On the other hand, the second-input memory 102-2 is used for storing input inverse-Fourier-transform data Y (k) represented by a frequency-domain signal output by the noise detection block 83. The control unit 101 receives the Fourier-transform operation flag from the controller 67.

With the Fourier-transform operation flag set at the H level to indicate that the Fourier-transform processing is requested, the input Fourier-transform data x (n), where n=0, 1, . . . and (N−1), is stored at an address n in the first-input memory 102-1. The address n is specified by the control unit 101.

With the Fourier-transform operation flag set at the L level to indicate that the inverse-Fourier-transform processing is requested, on the other hand, the input inverse-Fourier-transform data Y (k), where k=0, 1, . . . and (N−1), is stored at an address k in the second-input memory 102-2. The address k is specified also by the control unit 101.

With the Fourier-transform operation flag set at the H level, the input-signal selection unit 103 selects the input Fourier-transform data (n) stored in the first-input memory 102-1. With the Fourier-transform operation flag set at the L level, on the other hand, the input-signal selection unit 103 selects the input inverse-Fourier-transform data Y (k) stored in the second-input memory 102-2. In actuality, the input-signal selection unit 103 selects the input Fourier-transform data x (n) stored in the first-input memory 102-1 or the input inverse-Fourier-transform data Y (k) stored in the second-input memory 102-2 in accordance with a select signal which is output by the control unit 101 on the basis of the level of the Fourier-transform operation flag supplied to the control unit 101.

The Fourier-transform execution unit 104 carries out processing according to Eq. (4) given earlier in order to perform Fourier transform on data a (i) selected by the input-signal selection unit 103, where i=0, 1, . . . and (N−1).

With the Fourier-transform operation flag set at the H level, the Fourier-transform execution unit 104 outputs the Fourier-transform result A (m) to the first-output memory 105-1 and stores the Fourier-transform result A (m) at an address m in the first-output memory 105-1 where m=0, 1, . . . and (N−1). With the Fourier-transform operation flag set at the J, level, on the other had, the Fourier-transform execution unit 104 outputs the Fourier-transform result A (m) to the second-output memory 105-2 and stores the Fourier-transform result A (m) at an address m in the second-output memory 105-2 where m=0, 1, . . . and (N−1). In either case, the address m is specified by the control unit 101.

The control unit 101 specifies addresses 0, 1, . . . and (N−1) in their enumeration order in order to sequentially read out Fourier-transform results X (0), X (1), . . . and X (N−1) from the first-output memory 105-1. In addition, the control unit 101 specifies addresses 0, (N−1), (N−2), . . . , 2 and 1 in their enumeration order in order to sequentially read out the results of the Fourier transform as inverse-Fourier-transform results y (0), y (1), . . . and y (N−1) from the second-output memory 105-2.

In accordance with the second typical configuration shown in FIG. 8, it is possible to deal with a case in which the input timings of the Fourier-transform data coincide with the input timings of the inverse-Fourier-transform data or a case in which the output timings of the Fourier-transform results coincide with the output timings of the inverse-Fourier-transform results. In addition, by combining the Fourier-transform execution unit 23 and the inverse-Fourier-transform execution unit 33 into the Fourier-transform execution unit 104 common to the Fourier-transform processing and the inverse-Fourier-transform processing, the circuit scale of the signal receiving apparatus 51 can be reduced.

Next, processing carried out by the signal processing block 84 shown in FIG. 8 is explained by referring to a flowchart shown in FIG. 9 as follows.

Figure 9:
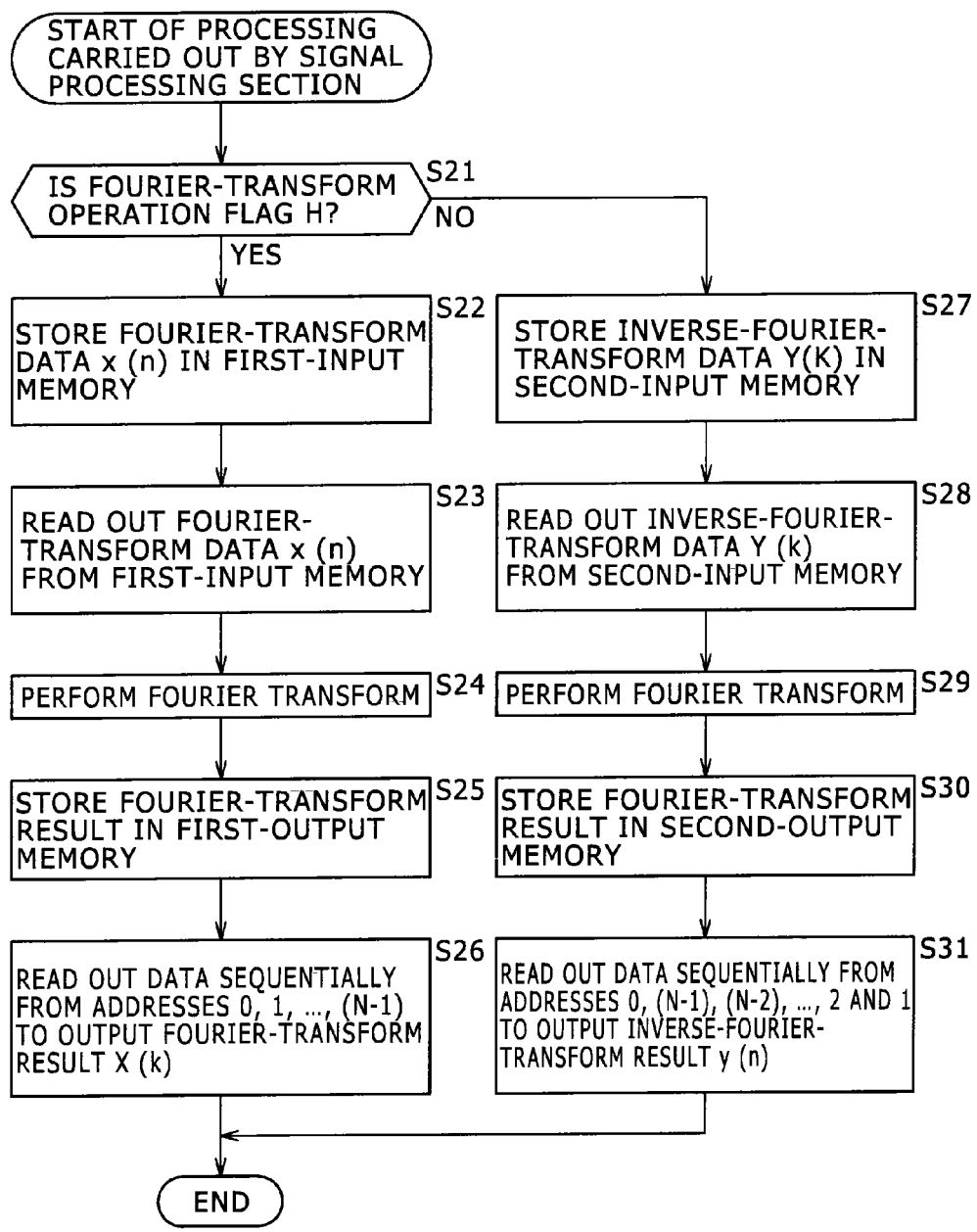
FIG. 9 shows an explanatory flowchart representing processing carried out by the signal processing block shown in FIG. 8.

The flowchart shown in FIG. 9 begins with a step S21 at which the control unit 101 determines whether or not the Fourier-transform operation flag has been set at the H level.

If the control unit 101 determines at the step S21 that the Fourier-transform operation flag has been set at the H level, the flow of the processing goes on to a step S22 at which the control unit 101 stores input Fourier-transform data x (n) in the first-input memory 102-1.

Then, at the next step S23, the input-signal selection unit 103 reads out the Fourier-transform data x (n) from the first-input memory 102-1 and outputs the Fourier-transform data x (n) to the Fourier-transform execution unit 104.

Subsequently, at the next step S24, the Fourier-transform execution unit 104 carries out Fourier transform on the Fourier-transform data x (n) received from the input-signal selection unit 103.

Then, at the next step S25, the Fourier-transform execution unit 104 outputs the results of the Fourier transform to the first-output memory 105-1 and stores the results in the first-output memory 105-1 in accordance with control carried out by the control unit 101.

Subsequently, at the next step S26, the control unit 101 specifies read addresses 0, 1, . . . and (N−1) in their enumeration order and carries out control to sequentially read out the Fourier-transform results X (k) from the read addresses 0, 1, . . . and (N−1) in the first-output memory 105-1.

If the control unit 101 determines at the step S21 that the Fourier-transform operation flag has been set at the L level, on the other hand, the flow of the processing goes on to a step S27 at which the control unit 101 stores input inverse-Fourier-transform data Y (k) in the second-input memory 102-2.

Then, at the next step S28, the input-signal selection unit 103 reads out the inverse-Fourier-transform data Y (k) from the second-input memory 102-2 and outputs the inverse-Fourier-transform data Y (k) to the Fourier-transform execution unit 104.

Subsequently, at the next step S29, the Fourier-transform execution unit 104 carries out Fourier transform on the inverse-Fourier-transform data Y (k) received from the input-signal selection unit 103.

Then, at the next step S30, the Fourier-transform execution unit 104 outputs the results of the Fourier transform to the second-output memory 105-2 and stores the results in the second-output memory 105-2 in accordance with control carried out by the control unit 101.

Subsequently, at the next step S31, the control unit 101 specifies read addresses 0, (N−1), (N−2), . . . , 2 and 1 in their enumeration order and carries out control to sequentially read out the results of the Fourier transform as the inverse-Fourier-transform results y (0), y (1), . . . and y (N−1) from the second-output memory 105-2. Then, after the inverse-Fourier-transform results y (n) have been output, the processing is finally terminated.

Third Typical Configuration

Figure 10:
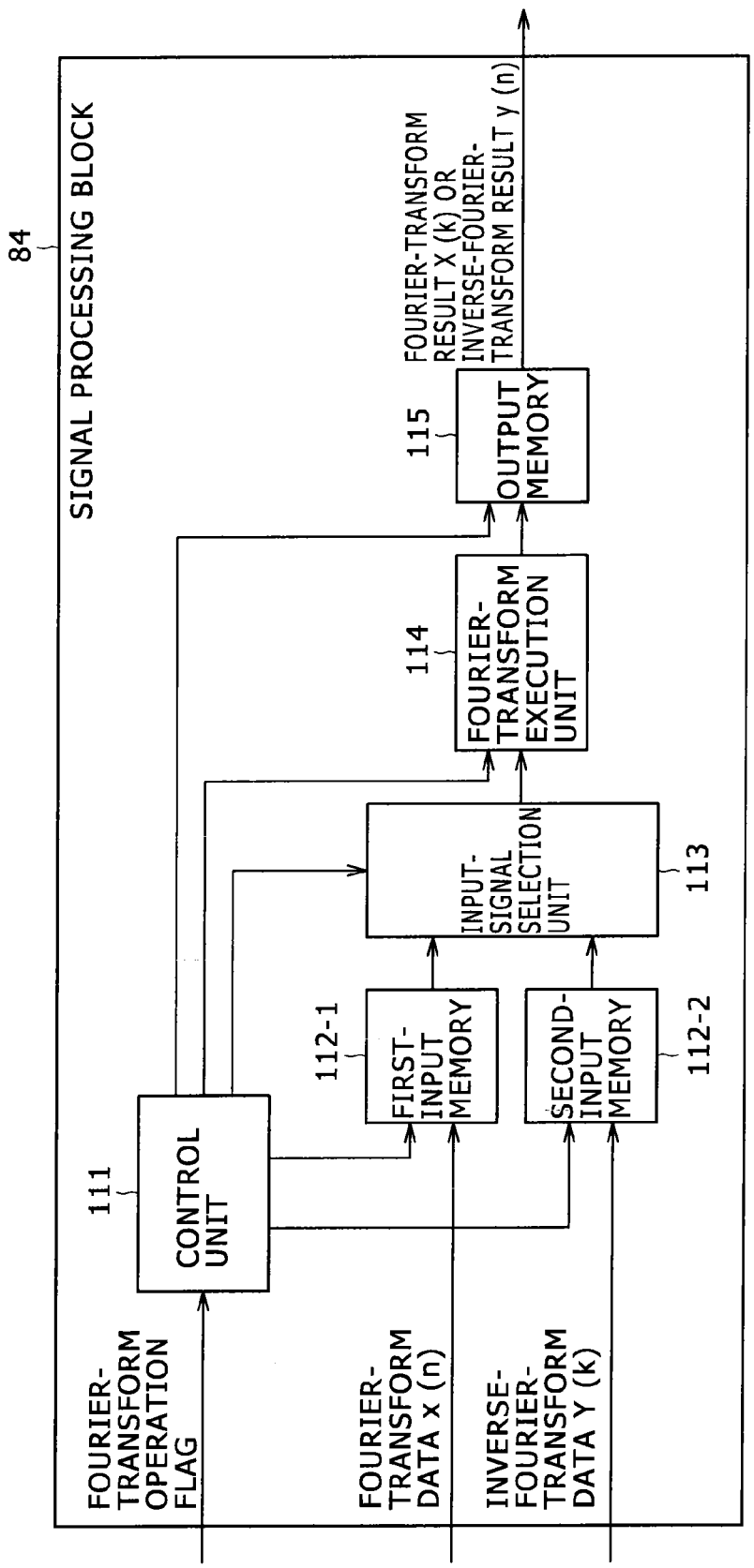
FIG. 10 is a block diagram showing a third typical configuration of the signal processing block.

FIG. 10 is a block diagram showing a third typical configuration of the signal processing block 84.

The third typical configuration shown in FIG. 10 is different from the first typical configuration shown in FIG. 6 in that, in the case of the third typical configuration, a first-input memory 112-1 used for storing input Fourier-transform data x (n) and a second-input memory 112-2 used for storing input inverse-Fourier-transform data Y (k) are provided in place of the input memory 93 employed in the first typical configuration. The signal processing block 84 shown in FIG. 10 employs the input memories 32 and 22 of the inverse-Fourier-transform processing block 14 and the Fourier-transform processing block 16 respectively as they are but combines the output memories 34 and 24 of the inverse-Fourier-transform processing block 14 and the Fourier-transform processing block 16 respectively into an output memory 115. In addition, the signal processing block 84 shown in FIG. 10 also combines the execution sections 33 and 23 of the inverse-Fourier-transform processing block 14 and the Fourier-transform processing block 16 respectively into the Fourier-transform execution unit 114 so as to carry out the functions of both the inverse-Fourier-transform processing block 14 and the Fourier-transform-processing block 16.

As shown in FIG. 10, the signal processing block 84 is configured to include a control unit 111, the first-input memory 112-1, the second-input memory 112-2, an input-signal selection unit 113, the Fourier-transform execution unit 114 and the output memory 115. As described above, the first-input memory 112-1 is used for storing input Fourier-transform data x (n) represented by a time-domain signal output by the channel inference block 85. On the other hand, the second-input memory 112-2 is used for storing input inverse-Fourier-transform data Y (k) represented by a frequency-domain signal output by the noise detection block 83. The control unit 111 receives the Fourier-transform operation flag from the controller 67.

With the Fourier-transform operation flag set at the H level, the input Fourier-transform data x (n), where n=0, 1, ... and (N−1), is stored at an address n in the first-input memory 112-1. The address n is specified by the control unit 111.

With the Fourier-transform operation flag set at the L level, on the other hand, the input inverse-Fourier-transform data Y (k), where k=0, 1, ... and (N−1), is stored at an address k in the second-input memory 112-2. The address k is specified also by the control unit 111.

With the Fourier-transform operation flag set at the H level, the input-signal selection unit 113 selects the input Fourier-transform data x (n) stored in the first-input memory 112-1. With the Fourier-transform operation flag set at the L level, on the other hand, the input-signal selection unit 113 selects the input inverse-Fourier-transform data Y (k) stored in the second-input memory 112-2. In actuality, the input-signal selection unit 113 selects the input Fourier-transform data x (n) stored in the first-input memory 112-1 or the input inverse-Fourier-transform data Y (k) stored in the second-input memory 112-2 in accordance with a select signal which is output by the control unit 111 on the basis of the level of the Fourier-transform operation flag supplied to the control unit 111.

The Fourier-transform execution unit 114 carries out processing according to Eq. (4) given earlier in order to perform Fourier transform on data a (i) selected by the input-signal selection unit 113, where i=0, 1, ... and (N−1). The Fourier-transform execution unit 114 outputs the Fourier-transform result A (m) to the output memory 115 and stores the Fourier-transform result A (m) at an address m in the output memory 115 where m=0, 1, ... and (N−1). The address m is specified by the control unit 111.

The control unit 111 specifies addresses 0, 1, ... and (N−1) in their enumeration order in order to sequentially read out Fourier-transform results X (0), X (1), ... and X (N−1) from the output memory 115. In addition, the control unit 111 specifies addresses 0, (N−1), (N−2), ..., 2 and 1 in their enumeration order in order to sequentially read out the results of the Fourier transform as inverse-Fourier-transform results y (0), y (1), ... and y (N−1) from the output memory 115.

In accordance with the third typical configuration shown in FIG. 10, it is possible to deal with a case in which the input timings of the Fourier-transform data coincide with the input timings of the inverse-Fourier-transform data. In addition, by combining the Fourier-transform execution unit 23 and the inverse-Fourier-transform execution unit 33 into the Fourier-transform execution unit 114 common to the Fourier-transform processing and the inverse-Fourier-transform processing and combining the output memory 24 and the output memory 34 into the output memory 115 also common to the Fourier-transform processing and the inverse-Fourier-transform processing, the circuit scale of the signal receiving apparatus 51 can be reduced.

Next, processing carried out by the signal processing block 84 shown in FIG. 10 is explained by referring to a flowchart shown in FIG. 11 as follows.

Figure 11:
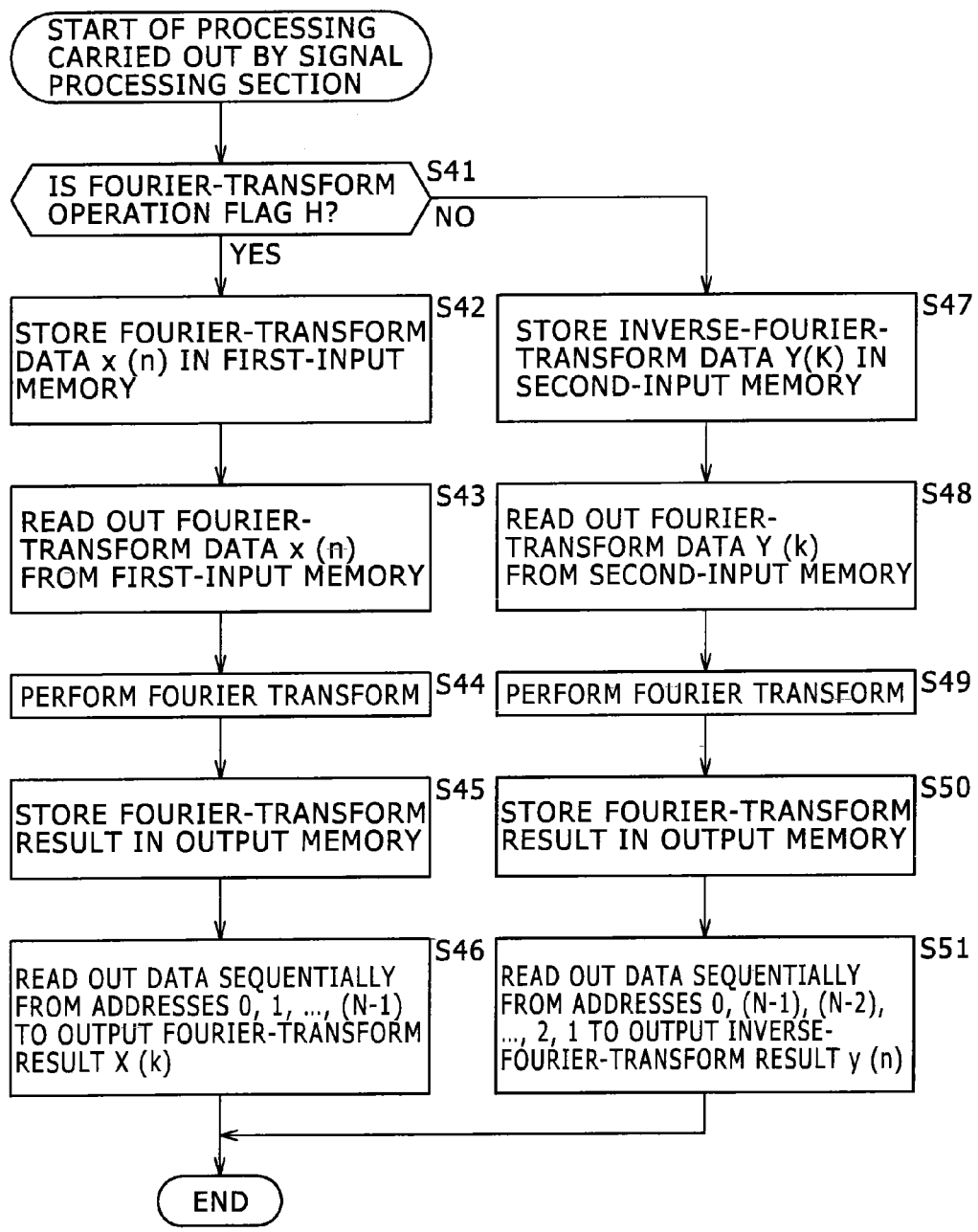
FIG. 11 shows an explanatory flowchart representing processing carried out by the signal processing block shown in FIG. 10.

The flowchart shown in FIG. 11 begins with a step S41 at which the control unit 111 determines whether or not the Fourier-transform operation flag has been set at the H level.

If the control unit 111 determines at the step S41 that the Fourier-transform operation flag has been set at the H level, the flow of the processing goes on to a step S42 at which the control unit 111 stores input Fourier-transform data x (n) in the first-input memory 112-1.

Then, at the next step S43, the input-signal selection unit 113 reads out the Fourier-transform data x (n) from the first-input memory 112-1 and outputs the Fourier-transform data x (n) to the Fourier-transform execution unit 114.

Subsequently, at the next step S44, the Fourier-transform execution unit 114 carries out Fourier transform on the Fourier-transform data x (n) received from the input-signal selection unit 113.

Then, at the next step S45, the Fourier-transform execution unit 114 outputs the results of the Fourier transform to the output memory 115 and stores the results in the output memory 115 in accordance with control carried out by the control unit 111.

Subsequently, at the next step S46, the control unit 111 specifies read addresses 0, 1, ... and (N−1) in their enumeration order and carries out control to sequentially read out the Fourier-transform results X (k) from the read addresses 0, 1, ... and (N−1) in the output memory 115.

If the control unit 111 determines at the step S41 that the Fourier-transform operation flag has been set at the L level, on the other hand, the flow of the processing goes on to a step S47 at which the control unit 111 stores input inverse-Fourier-transform data Y (k) in the second-input memory 112-2.

Then, at the next step S48, the input-signal selection unit 113 reads out the inverse-Fourier-transform data Y (k) from the second-input memory 112-2 and outputs the inverse-Fourier-transform data Y (k) to the Fourier-transform execution unit 114.

Subsequently, at the next step S49, the Fourier-transform execution unit 114 carries out Fourier transform on the inverse-Fourier-transform data Y (k) received from the input-signal selection unit 113.

Then, at the next step S50, the Fourier-transform execution unit 114 outputs the results of the Fourier transform to the output memory 115 and stores the results in the output memory 115 in accordance with control carried out by the control unit 111.

Subsequently, at the next step S51, the control unit 111 specifies read addresses 0, (N−1), (N−2), ..., 2 and 1 in their enumeration order and carries out control to sequentially read out the results of the Fourier transform as the inverse-Fourier-transform results y (0), y (1), ... and y (N−1) from the output memory 115. Then, after the inverse-Fourier-transform results y (n) have been output, the processing is finally terminated.

Fourth Typical Configuration

Figure 12:
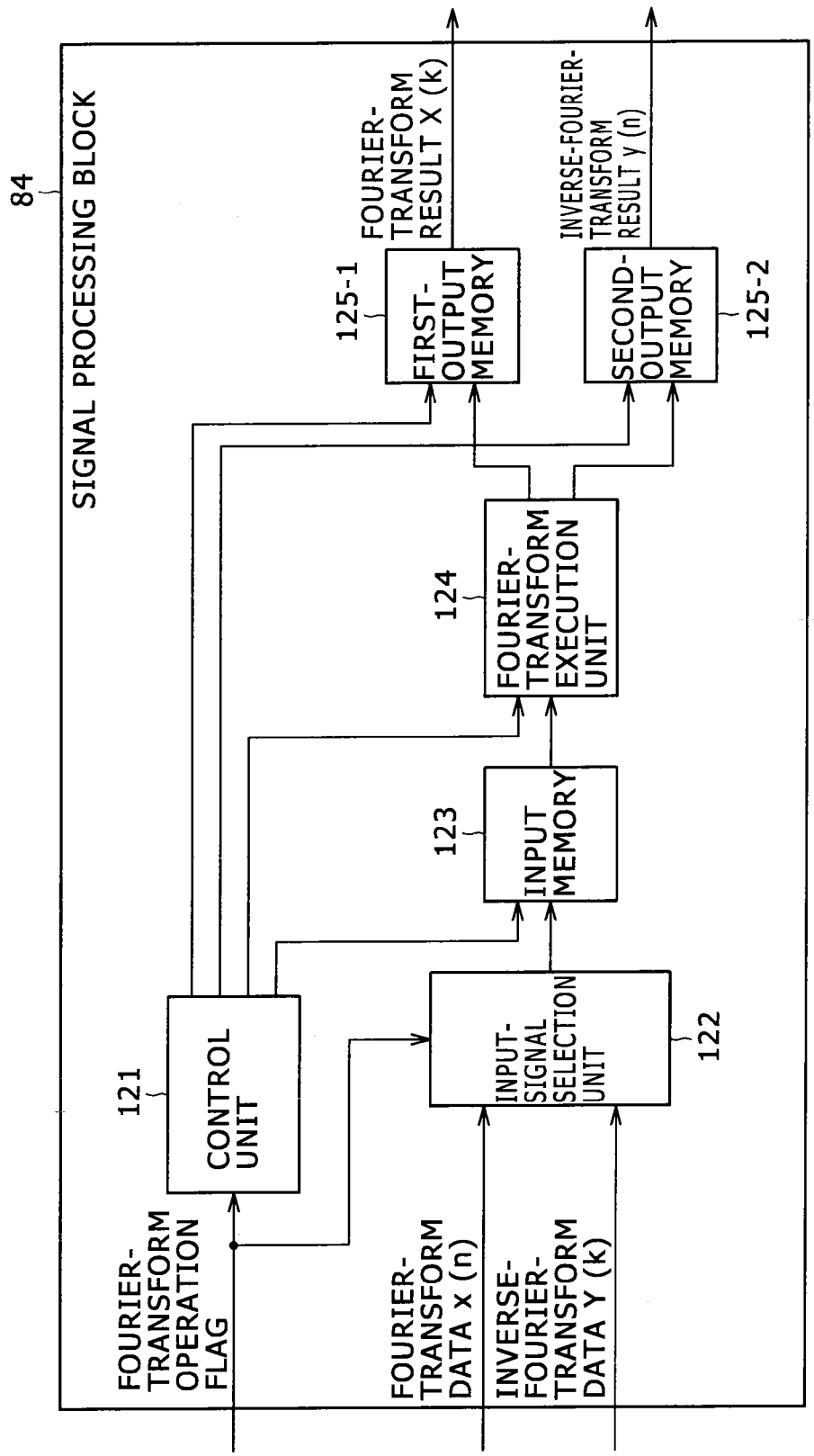
FIG. 12 is a block diagram showing a fourth typical configuration of the signal processing block.

FIG. 12 is a block diagram showing a fourth typical configuration of the signal processing block 84.

The fourth typical configuration shown in FIG. 12 is different from the first typical configuration shown in FIG. 6 in that, in the case of the fourth typical configuration, a first-output memory 125-1 used for storing Fourier-transform results X (k) of Fourier-transform processing and a second-output memory 125-2 used for storing inverse-Fourier-transform results y (n) of inverse-Fourier-transform processing are provided in place of the output memory 95 employed in the first typical configuration. The signal processing block 84 shown in FIG. 12 employs the output memories 34 and 24 of the inverse-Fourier-transform processing block 14 and the Fourier-transform processing block 16 respectively as they are but combines the input memories 32 and 22 of the inverse-Fourier-transform processing block 14 and the Fourier-transform processing block 16 respectively into an input memory 123. In addition, the signal processing block 84 shown in FIG. 12 also combines the execution sections 33 and 23 of the inverse-Fourier-transform processing block 14 and the Fourier-transform processing block 16 respectively into the Fourier-transform execution unit 124 so as to carry out the functions of both the inverse-Fourier-transform processing block 14 and the Fourier-transform processing block 16.

As shown in FIG. 12, the signal processing block 84 is configured to include a control unit 121, an input-signal selection unit 122, the input memory 123, the Fourier-transform execution unit 124, the first-output memory 125-1 and the second-output memory 125-2. The input-signal selection unit 122 receives Fourier-transform data which is data represented by the time-domain signal output by the channel inference block 85. In addition, the input-signal selection unit 122 also receives inverse-Fourier-transform data which is data represented by the frequency-domain signal output by the noise detection block 83. The Fourier-transform operation flag output by the controller 67 is supplied to the control unit 121 and the input-signal selection unit 122.

With the Fourier-transform operation flag set at the H level, the input-signal selection unit 122 selects the input Fourier-transform data x (n), where n=0, 1, . . . and (N−1), and outputs the selected data to the input memory 123. With the Fourier-transform operation flag set at the L level, on the other hand, the input-signal selection unit 122 selects the input inverse-Fourier-transform data Y (k), where k=0, 1, . . . and (N−1), and outputs the selected data to the input memory 123.

The data a (i) output by the input-signal selection unit 122 is stored at an address i in the input memory 123. The address i is specified by the control unit 121.

The Fourier-transform execution unit 124 carries out processing according to Eq. (4) given earlier in order to perform Fourier transform on the data a (i) stored in the input memory 123, where i=0, 1, . . . and (N−1).

With the Fourier-transform operation flag set at the H level, the Fourier-transform execution unit 124 outputs a Fourier-transform result A (m) to the first-output memory 125-1 and stores the Fourier-transform result A (m) at an address m in the first-output memory 125-1 where m=0, 1, . . . and (N−1). With the Fourier-transform operation flag set at the L level, on the other hand, the Fourier-transform execution unit 124 outputs the Fourier-transform result A (m) to the second-output memory 125-2 and stores the Fourier-transform result A (m) at an address m in the second-output memory 125-2 where m=0, 1, . . . and (N−1). In either case, the address m is specified by the control unit 121.

The control unit 121 specifies addresses 0, 1, . . . and (N−1) in their enumeration order in order to sequentially read out Fourier-transform results X (0), X (1), . . . and X (N−1) from the first-output memory 125-1. In addition, the control unit 121 specifies addresses 0, (N−1), (N−2), . . . , 2 and 1 in their enumeration order in order to sequentially read out the results of the Fourier transform as inverse-Fourier-transform results y (0), y (1), . . . and y (N−1) from the second-output memory 125-2.

In accordance with the fourth typical configuration shown in FIG. 12, it is possible to deal with a case in which the output timings of the Fourier-transform results coincide with the output timings of the inverse-Fourier-transform results. In addition, by combining the input memory 22 and the input memory 32 into the input memory 123 common to the Fourier-transform processing and the inverse-Fourier transform processing and combining the Fourier-transform execution unit 23 and the inverse-Fourier-transform execution unit 33 into the Fourier-transform execution unit 124 also common to the Fourier-transform processing and the inverse-Fourier-transform processing, the circuit scale of the signal receiving apparatus 51 can be reduced.

Next, processing carried out by the signal processing block 84 shown in FIG. 12 is explained by referring to a flowchart shown in FIG. 13 as follows.

Figure 13:
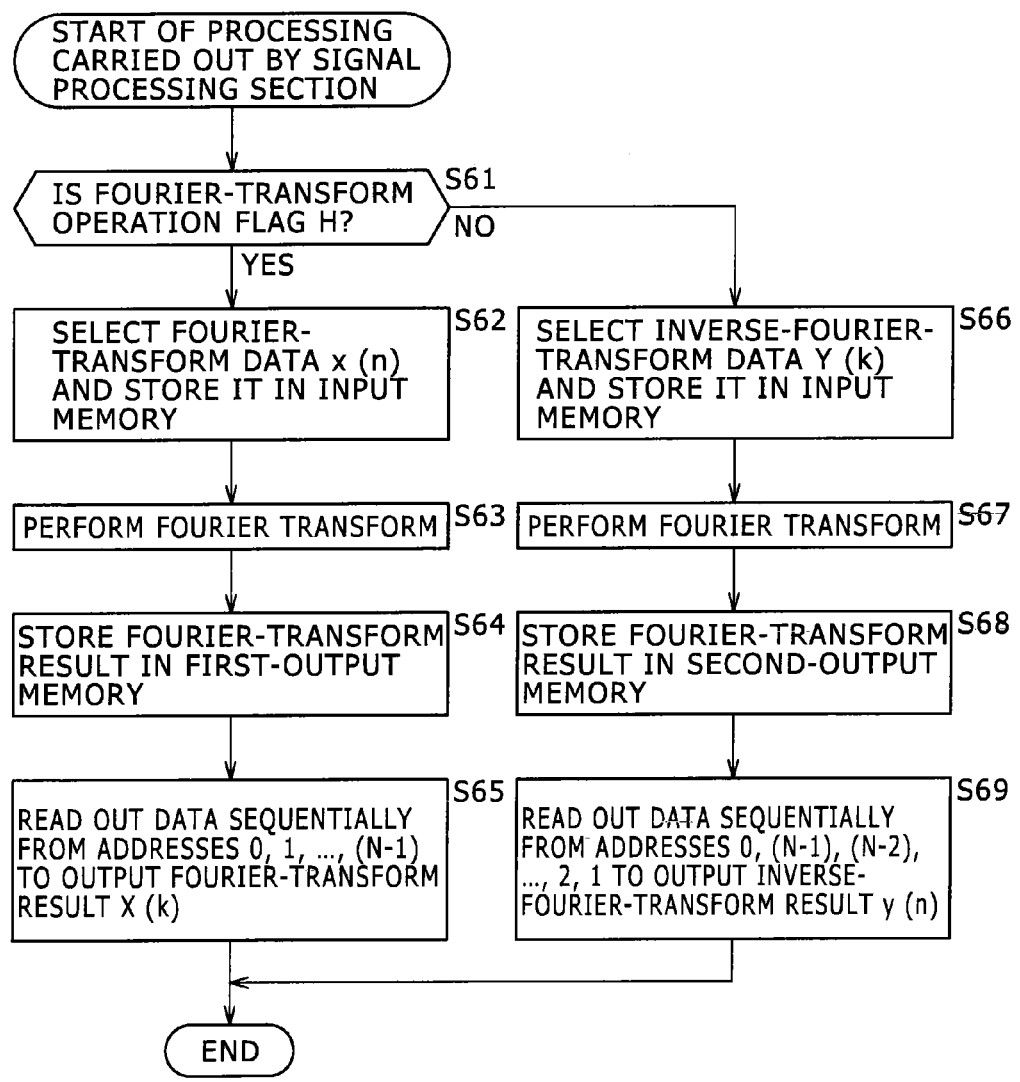
FIG. 13 shows an explanatory flowchart representing processing carried out by the signal processing block shown in FIG. 12.

The flowchart shown in FIG. 13 begins with a step S61 at which the input-signal selection unit 122 determines whether or not the Fourier-transform operation flag has been set at the H level.

If the input-signal selection unit 122 determines at the step S61 that the Fourier-transform operation flag has been set at the H level, the flow of the processing goes on to a step S62 at which the input-signal selection unit 122 selects input Fourier-transform data x (n). Then, the input-signal selection unit 122 stores the Fourier-transform data x (n) in the input memory 123 in accordance with control carried out by the control unit 121.

Subsequently, at the next step S63, the Fourier-transform execution unit 124 carries out Fourier transform on the Fourier-transform data x (n) stored in the input memory 123.

Then, at the next step S64, the Fourier-transform execution unit 124 stores the results of the Fourier transform in the first-output memory 125-1 in accordance with control carried out by the control unit 121.

Subsequently, at the next step S65, the control unit 121 specifies read addresses 0, 1, . . . and (N−1) in their enumeration order and carries out control to sequentially read out the Fourier-transform results X (k) from the read addresses 0, 1, . . . and (N−1) in the first-output memory 125-1.

If the input-signal selection unit 122 determines at the step S61 that the Fourier-transform operation flag has been set at the L level, on the other hand, the flow of the processing goes on to a step S66 at which the input-signal selection unit 122 selects input inverse-Fourier-transform data Y (k). Then, the input-signal selection unit 122 stores the inverse-Fourier-transform data Y (k) in the input memory 123 in accordance with control carried out by the control unit 121.

Subsequently, at the next step S67, the Fourier-transform execution unit 124 carries out Fourier transform on the inverse-Fourier-transform data Y (k) stored in the input memory 123.

Then, at the next step S68, the Fourier-transform execution unit 124 stores the results of the Fourier transform in the second-output memory 125-2 as inverse-Fourier-transform results y (n) in accordance with control carried out by the control unit 121.

Subsequently, at the next step S69, the control unit 121 specifies read addresses 0, (N−1), (N−2), . . . , 2 and 1 in their enumeration order and carries out control to sequentially read out the results of the Fourier transform as the inverse-Fourier-transform results y (0), y (1), . . . and y (N−1) from the second-output memory 125-2. Then, after the inverse-Fourier-transform results y (n) have been output, the processing is finally terminated.

Fifth Typical Configuration

Figure 14:
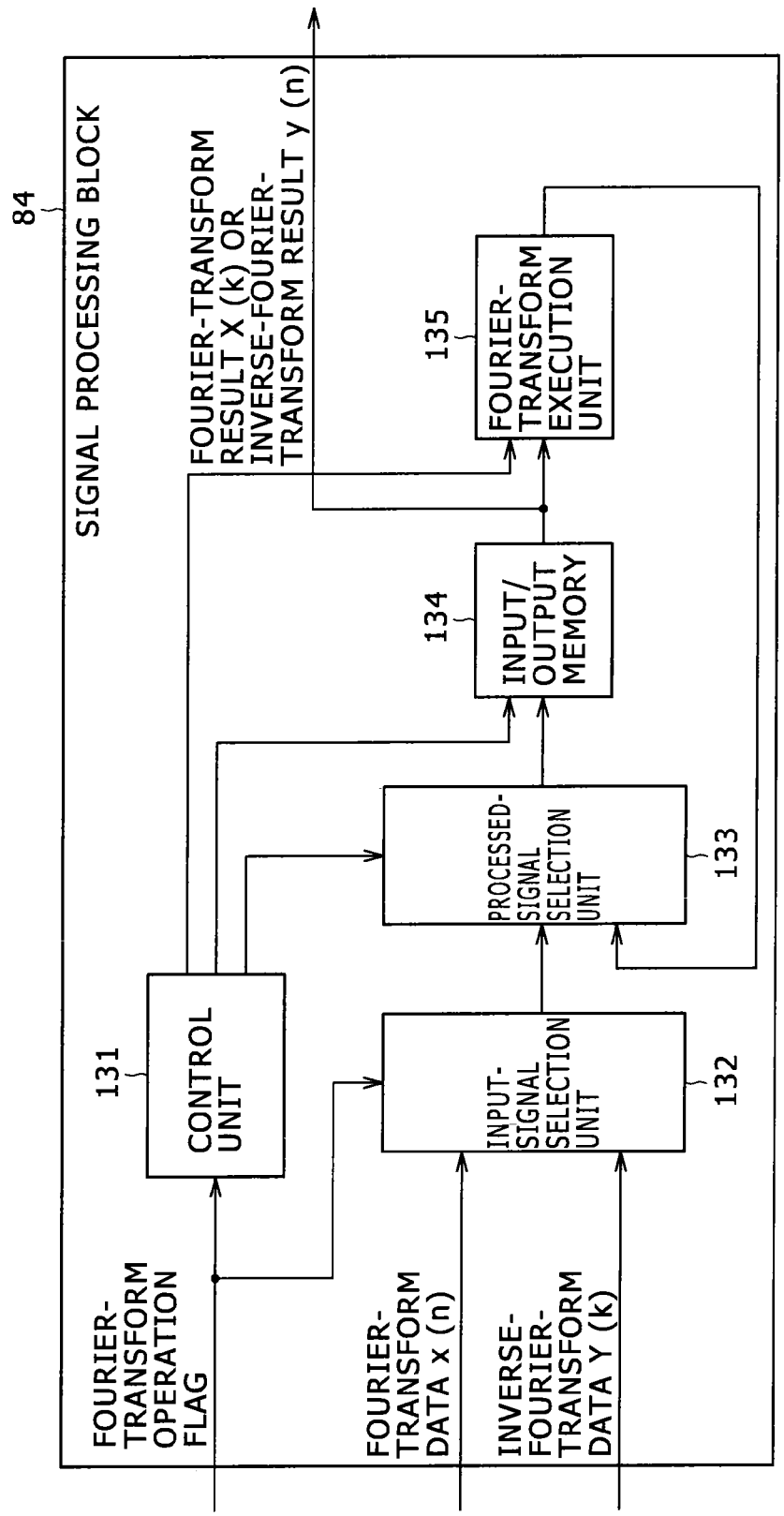
FIG. 14 is a block diagram showing a fifth typical configuration of the signal processing block.

FIG. 14 is a block diagram showing a fifth typical configuration of the signal processing block 84.

The fifth typical configuration shown in FIG. 14 is different from the first typical configuration shown in FIG. 6 in that, in the case of the fifth typical configuration, an input/output memory 134 used for storing input data and processing results is provided in place of the input memory 93 and the output memory 95 which are employed in the first typical configuration.

As shown in FIG. 14, the signal processing block 84 is configured to include a control unit 131, an input-signal selection unit 132, a processed signal selection unit 133, an input/output memory 134 and a Fourier-transform execution unit 135. The input-signal selection unit 132 receives Fourier-transform data which is data represented by the time-domain signal output by the channel inference block 85. In addition, the input-signal selection unit 132 also receives inverse-Fourier-transform data which is data represented by the frequency-domain signal output by the noise detection block 83. The Fourier-transform operation flag output by the controller 67 is supplied to the control unit 131 and the input-signal selection unit 132.

With the Fourier-transform operation flag set at the H level, the input-signal selection unit 132 selects the input Fourier-transform data x (n), where n=0, 1, . . . and (N−1), and outputs the selected data to the processed-signal selection unit 133 as data a (i) where i=0, 1, . . . and (N−1). With the Fourier-transform operation flag set at the L level, on the other hand, the input-signal selection unit 132 selects the input inverse-Fourier-transform data Y (k), where k=0, 1, . . . and (N−1), and outputs the selected data to the processed signal selection unit 133 as data a (i) where i=0, 1, . . . and (N−1).

As described above, the processed-signal selection unit 133 receives the data a (i), which is the input Fourier-transform data x (n) or the input inverse-Fourier-transform data Y (k), from the input-signal selection unit 132. In addition, the processed-signal selection unit 133 also receives an Fourier-transform result A (m) where m=0, 1, . . . and (N−1) from the Fourier-transform execution unit 135 as described later where m=0, 1, . . . and (N−1). In accordance with a select signal received from the control unit 131, the processed-signal selection unit 133 selects the data a (i) and passes on the data a (i) as data b (i) where i=0, 1, . . . and (N−1) to the input/output memory 134 or selects the Fourier-transform result A (m) and passes on the Fourier-transform result A (m) as data b (m) where m=0, 1, . . . and (N−1) to the input/output memory 134.

The data b (i) passed on by the processed-signal selection unit 133 from the input-signal selection unit 132 to the input/output memory 134 is stored at an address i specified by the control unit 131. By the same token, the data b (m) passed on by the processed-signal selection unit 133 from the Fourier-transform execution unit 135 to the input/output memory 134 is stored at an address m also specified by the control unit 131.

If the data a (i) has been stored in the input/output memory 134 as the data b (i), the Fourier-transform execution unit 135 carries out processing according to Eq. (4) on the data b (i) stored in the input/output memory 134 by making use of the data b (i) as the data a (i) of Eq. (4) in order to perform Fourier transform. The Fourier-transform execution unit 135 then supplies the Fourier-transform result A (m) to the processed-signal selection unit 133.

If the Fourier-transform result A (m) has been stored in the input/output memory 134 as the data b (m), on the other hand, the control unit 131 reads out the data b (m) from the input/output memory 134 as output data.

The data b (m) is read out sequentially from the input/output memory 134 as output data as follows. With the Fourier-transform operation flag set at the H level, the control unit 131 specifies addresses 0, 1, . . . and (N−1) in their enumeration order in order to sequentially read out Fourier-transform results X (0), X (1), . . . and X (N−1) from the input/output memory 134. With the Fourier-transform operation flag set at the L level, on the other hand, the control unit 131 specifies addresses 0, (N−1), (N−2), . . . , 2 and 1 in their enumeration order in order to sequentially read out the results of the Fourier transform as inverse-Fourier-transform results y (0), y (1), . . . and y (N−1) from the input/output memory 134.

In accordance with the fifth typical configuration shown in FIG. 14, the input and output memories are combined into one memory and, in addition, in the fifth typical configuration, the execution sections 33 and 23 of the inverse-Fourier-transform processing block 14 and the Fourier-transform processing block 16 respectively are combined into the Fourier-transform execution unit 135. Thus, the circuit scale of the signal receiving apparatus 51 can be reduced.

Next, processing carried out by the signal processing block 84 shown in FIG. 14 is explained by referring to a flowchart shown in FIG. 15 as follows.

Figure 15:
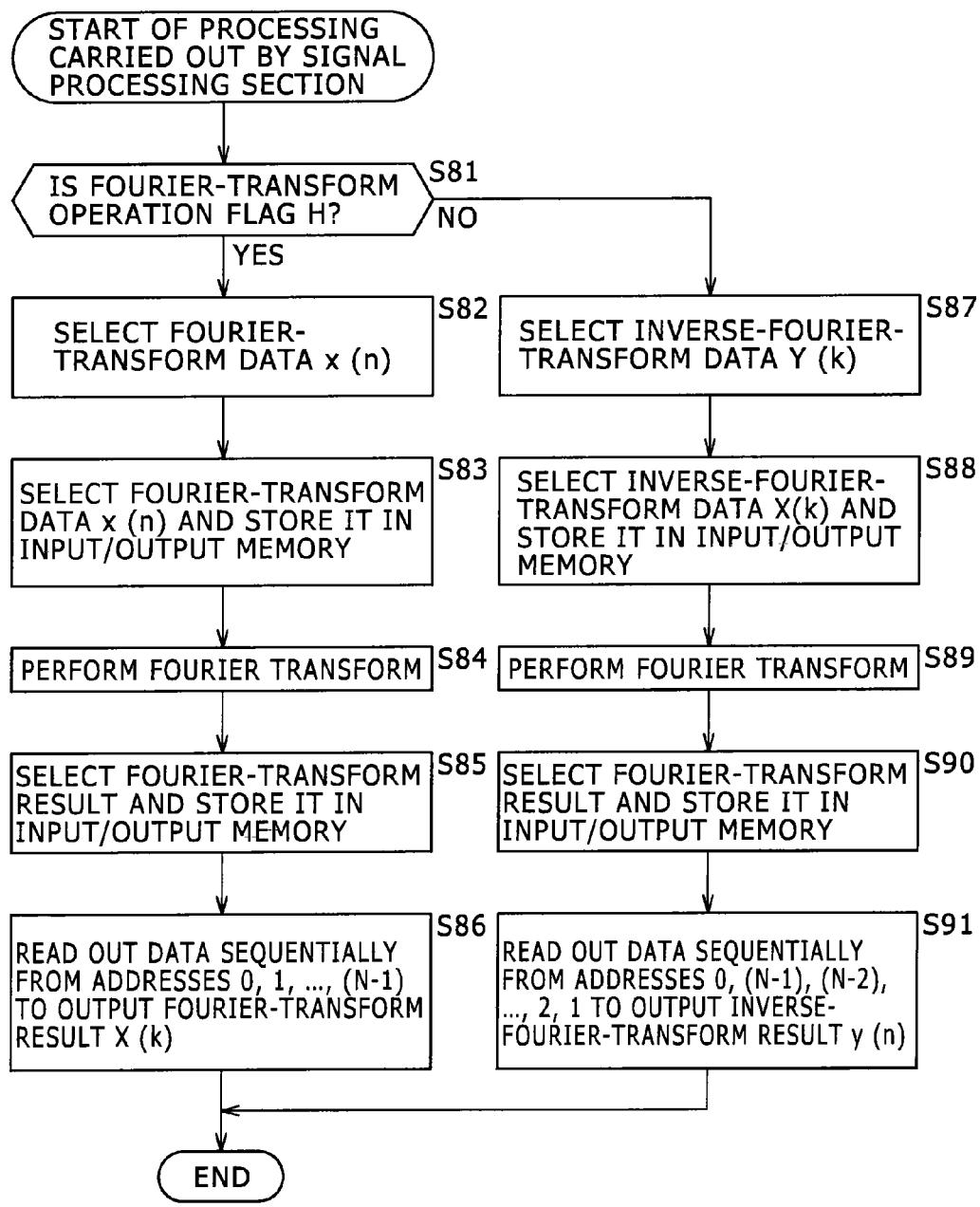
FIG. 15 shows an explanatory flowchart representing processing carried out by the signal processing block shown in FIG. 14.

The flowchart shown in FIG. 15 begins with a step S81 at which the input-signal selection unit 132 determines whether or not the Fourier-transform operation flag has been set at the H level.

If the input-signal selection unit 132 determines at the step S81 that the Fourier-transform operation flag has been set at the H level, the flow of the processing goes on to a step S82 at which the input-signal selection unit 132 selects input Fourier-transform data x (n) and outputs the input Fourier-transform data x (n) to the processed-signal selection unit 133.

Then, at the next step S83, the processed-signal selection unit 133 selects the Fourier-transform data x (n) received from the input-signal selection unit 132 and stores the Fourier-transform data x (n) in the input/output memory 134 in accordance with control carried out by the control unit 131.

Subsequently, at the next step S84, the Fourier-transform execution unit 135 carries out Fourier transform on the Fourier-transform data x (n) stored in the input/output memory 134 and supplies the result of the Fourier transform to the processed-signal selection unit 133.

Then, at the next step S85, the processed-signal selection unit 133 selects the Fourier-transform result received from the Fourier-transform execution unit 135 and stores the result in the input/output memory 134 in accordance with control carried out by the control unit 131.

Subsequently, at the next step S86, the control unit 131 specifies read addresses 0, 1, . . . and (N−1) in their enumeration order and carries out control to sequentially read out the Fourier-transform results X (k) from the read addresses 0, 1, . . . and (N−1) in the input/output memory 134.

If the input-signal selection unit 132 determines at the step S81 that the Fourier-transform operation flag has been set at the L level, on the other hand, the flow of the processing goes on to a step S87 at which the input-signal selection unit 132 selects input inverse-Fourier-transform data Y (k) and outputs the input inverse-Fourier-transform data Y (k) to the processed-signal selection unit 133.

Then, at the next step S88, in accordance with control carried out by the control unit 131, the processed-signal selection unit 133 selects the inverse-Fourier-transform data Y (k) received from the input-signal selection unit 132 and stores the inverse-Fourier-transform data Y (k) in the input/output memory 134.

Subsequently, at the next step S89, the Fourier-transform execution unit 135 carries out Fourier transform on the inverse-Fourier-transform data Y (k) stored in the input/output memory 134 and supplies the result of the Fourier transform to the processed-signal selection unit 133.

Then, at the next step S90, the processed-signal selection unit 133 selects the Fourier-transform result received from the Fourier-transform execution unit 135 and stores the result in the input/output memory 134 in accordance with control carried out by the control unit 131.

Subsequently, at the next step S91, the control unit 131 specifies read addresses 0, (N−1), (N−2), . . . , 2 and 1 in their enumeration order and carries out control to sequentially read out the results of the Fourier transform as the inverse-Fourier-transform results y (0), y (1), . . . and y (N−1) from the input/output memory 134. Then, after the inverse-Fourier-transform results y (n) have been output, the processing is finally terminated.

Typical Applications to Signal Receiving Systems

Figure 16:
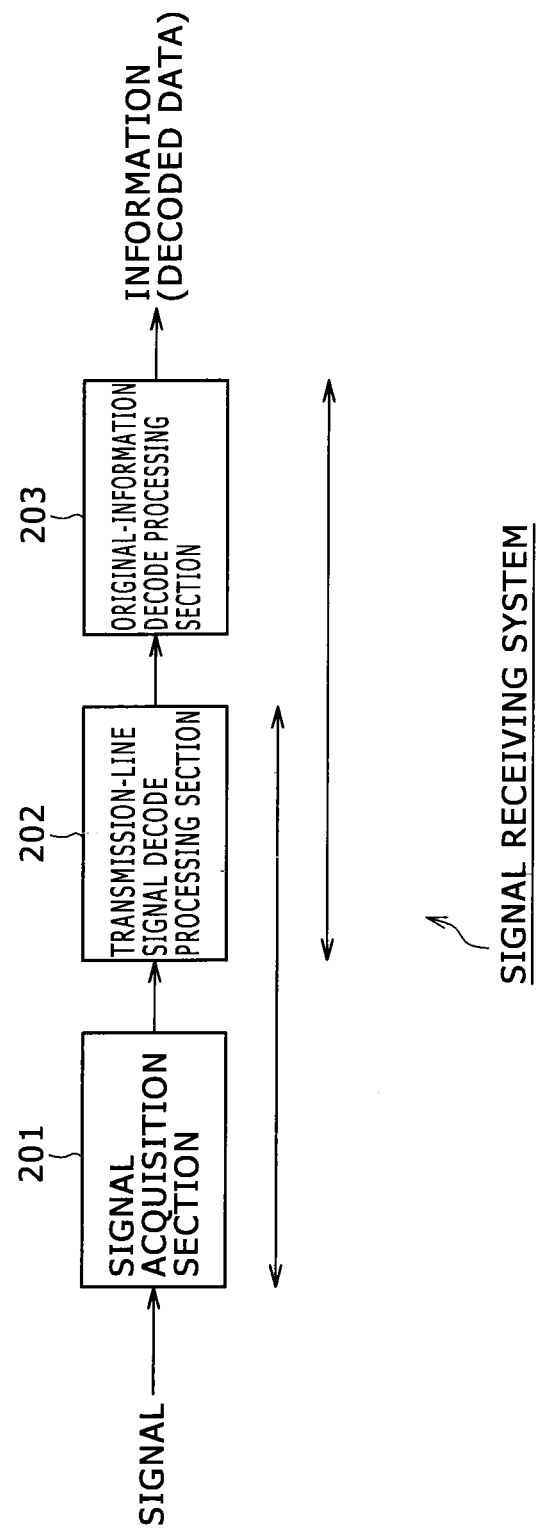
FIG. 16 is a block diagram showing a typical configuration of a signal receiving system according to a first embodiment.

FIG. 16 is a block diagram showing a typical configuration of a signal receiving system employing the multi-carrier demodulation section 66 in accordance with a first embodiment.

As shown in FIG. 16, the signal receiving system is configured to include a signal acquisition section 201, a transmission-line signal decode processing section 202 and an original-information decode processing section 203.

The signal acquisition section 201 is a section for acquiring a signal transmitted through a transmission line not shown in the figure and supplying the signal to the transmission-line signal decode processing section 202. Typical examples of the transmission line are the ground digital broadcasting, the satellite digital broadcasting, the CATV network and other networks including the Internet. The multi-carrier demodulation section 66 shown in FIG. 5 is typically included in the signal acquisition section 201.

The transmission-line signal decode processing section 202 is a section for carrying out processing to decode a signal transmitted to the signal acquisition section 201 through the transmission line and supplying a processing-result signal to the original-information decode processing section 203. The processing includes error correction.

The original-information decode processing section 203 is a section for carrying out original-information decode processing on the signal output by the transmission-line signal decode processing section 202 as a result of the transmission-line signal decode processing. The original-information decode processing at least includes a process to decompress compressed information conveyed by the received signal in order to generate the original information from the compressed information.

That is to say, the signal received by the signal acquisition section 201 from the transmission lines conveys information representing data such as images and sounds. In some cases, the information has been compressed by the signal transmitting apparatus in a compression-encoding process carried out by the signal transmitting apparatus in order to reduce the amount of data represented by the information. In such cases, the original-information decode processing section 203 must carry out decompression processing to decompress a signal, which is output by the transmission-line signal decode processing section 202 as a signal conveying the compressed information, in order to generate the original information from the compressed information.

It is to be noted that, if the signal received by the signal acquisition section 201 from the transmission lines conveys uncompressed information, the original-information decode processing section 203 does not carry out the decompression processing on the signal output by the transmission-line signal decode processing section 202.

A typical example of the decompression processing is MPEG decode processing. In addition, in some configurations, the original-information decode processing carried out by the transmission-line signal decode processing section 202 is not only followed by the decompression processing performed by the original-information decode processing section 203, but is also accompanied by descramble processing or other processing.

Typically, the signal receiving system having the configuration like the one shown in the FIG. 16 is applied to a TV tuner for receiving TV broadcasts which are transmitted as digital broadcast signals. It is to be noted that each of the signal acquisition section 201, the transmission-line signal decode processing section 202 and the original-information decode processing section 203 can be designed as a piece of hardware or a software module. The piece of hardware is typically a stand-alone apparatus or an IC (Integrated Circuit).

In addition, the signal acquisition section 201, the transmission-line signal decode processing section 202 and the original-information decode processing section 203 can be integrated with each other in a variety of stand-alone combinations described as follows. For example, the signal acquisition section 201 and the transmission-line signal decode processing section 202 are integrated with each other to form a set. As another alternative, the transmission-line signal decode processing section 202 and the original-information decode processing section 203 are integrated with each other to form a set. As a further alternative, the signal acquisition section 201, the transmission-line signal decode processing section 202 and the original-information decode processing section 203 are integrated to form a set.

Figure 17:
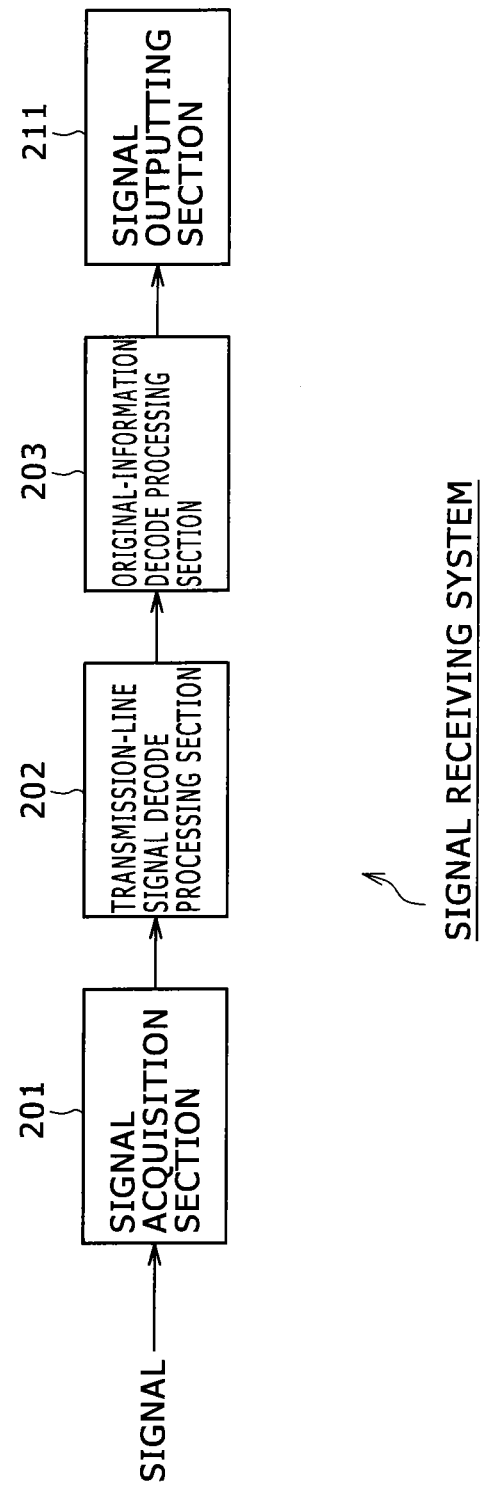
FIG. 17 is a block diagram showing a typical configuration of a signal receiving system according to a second embodiment.

FIG. 17 is a block diagram showing a typical configuration of a signal receiving system employing the multi-carrier demodulation section 66 in accordance with a second embodiment of the present disclosure.

In the typical configuration of the second embodiment implementing a signal receiving system as shown in FIG. 17, components identical with their respective counterparts employed in the typical configuration of the first embodiment implementing a signal receiving system as shown in FIG. 16 are denoted by the same reference numerals as the respective counterparts. In addition, the explanation of the identical components is not repeated.

The second embodiment implementing a signal receiving system as shown in the FIG. 17 also employs a signal acquisition section 201, a transmission-line signal decode processing section 202 and a original-information decode processing section 203 in the same way as the first embodiment implementing a signal receiving system as shown in the FIG. 16. The second embodiment is different from the first embodiment, however, in that the second embodiment is newly provided with a signal outputting section 211.

The signal outputting section 211 typically includes a display unit for displaying images and a speaker for outputting sounds. On the basis of a signal received from the original-information decode processing section 203, the display unit displays images whereas the speaker generates sounds. That is to say, the signal outputting section 211 displays images and generates sounds.

Typically, the signal receiving system having the configuration like the one shown in the FIG. 17 is applied to a TV for receiving TV broadcasts transmitted as digital broadcast signals and to a radio receiver for receiving radio broadcasts.

It is to be noted that, if the signal received by the signal acquisition section 201 is a signal not subjected to a compression encoding process, a signal output by the transmission-line signal decode processing section 202 can be supplied to the signal outputting section 211 directly.

Figure 18:
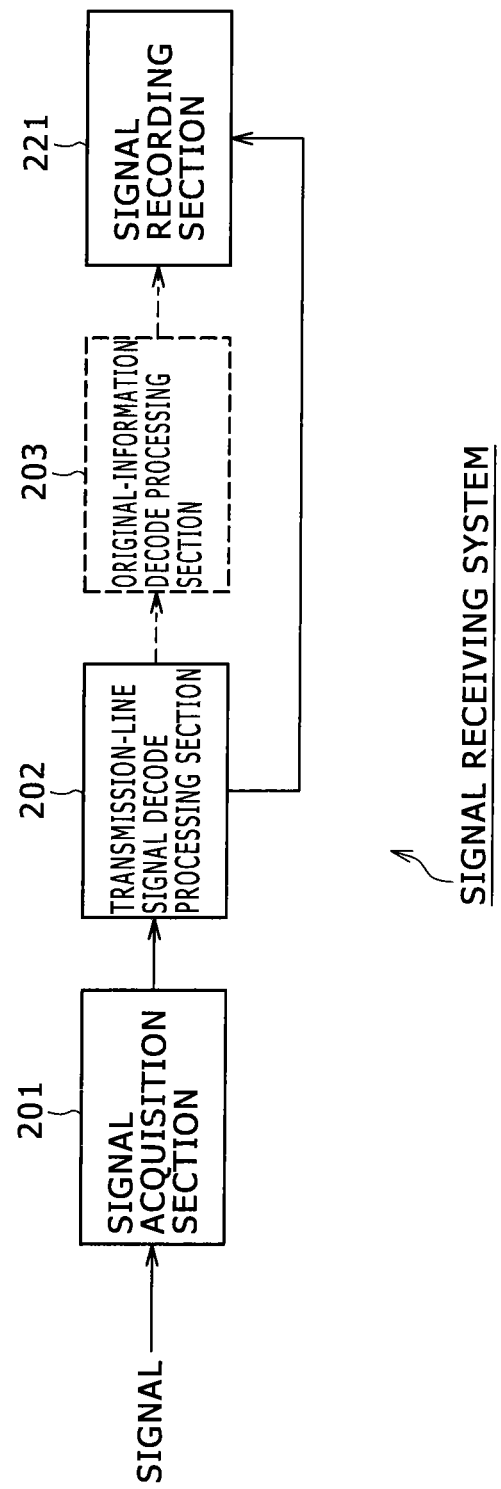
FIG. 18 is a block diagram showing a typical configuration of a signal receiving system according to a third embodiment.

FIG. 18 is a block diagram showing a typical configuration of a signal receiving system employing the multi-carrier demodulation section 66 in accordance with a third embodiment of the present disclosure.

In the typical configuration of the third embodiment implementing a signal receiving system as shown in the FIG. 18, components identical with their respective counterparts employed in the typical configuration of the first embodiment implementing a signal receiving system as shown in the FIG. 16 are denoted by the same reference numerals as the respective counterparts. In addition, the explanation of the identical components is not repeated.

The third embodiment implementing a signal receiving system as shown in the FIG. 18 also employs a signal acquisition section 201 and a transmission-line signal decode processing section 202 in the same way as the first embodiment implementing a signal receiving system as shown in the FIG. 16. The third embodiment is different from the first embodiment, however, in that the third embodiment does not employ an original-information decode processing section 203 but is newly provided with a signal recording section 221.

The signal recording section 221 is a section for recording (or storing) a signal output by the transmission-line signal decode processing section 202 into a recording (or storing) medium such as an optical disc, a hard disc (or a magnetic disc) or a flash memory. A typical example of the signal output by the transmission-line signal decode processing section 202 is TS packets of a TS conforming to the MPEG specifications.

Typically, the signal receiving system having the configuration like the one shown in the FIG. 18 is applied to a recorder used for recording TV broadcasts.

It is to be noted that the signal receiving system having the configuration like the one shown in the FIG. 18 may also employ an original-information decode processing section 203 for carrying out the original-information decode processing in order to generate a decoded signal which is then recorded onto the signal recording section 221. The decoded signal typically represents data of images and data of sounds.

Typical Configuration of a Computer

Every series of processes described previously can be carried out by making use of hardware and/or by execution of software. If the series of processes described above is carried out by execution of software, programs composing the software can be installed into a computer embedded in dedicated hardware, a general-purpose personal computer or the like from typically a removable recording medium.

Figure 19:
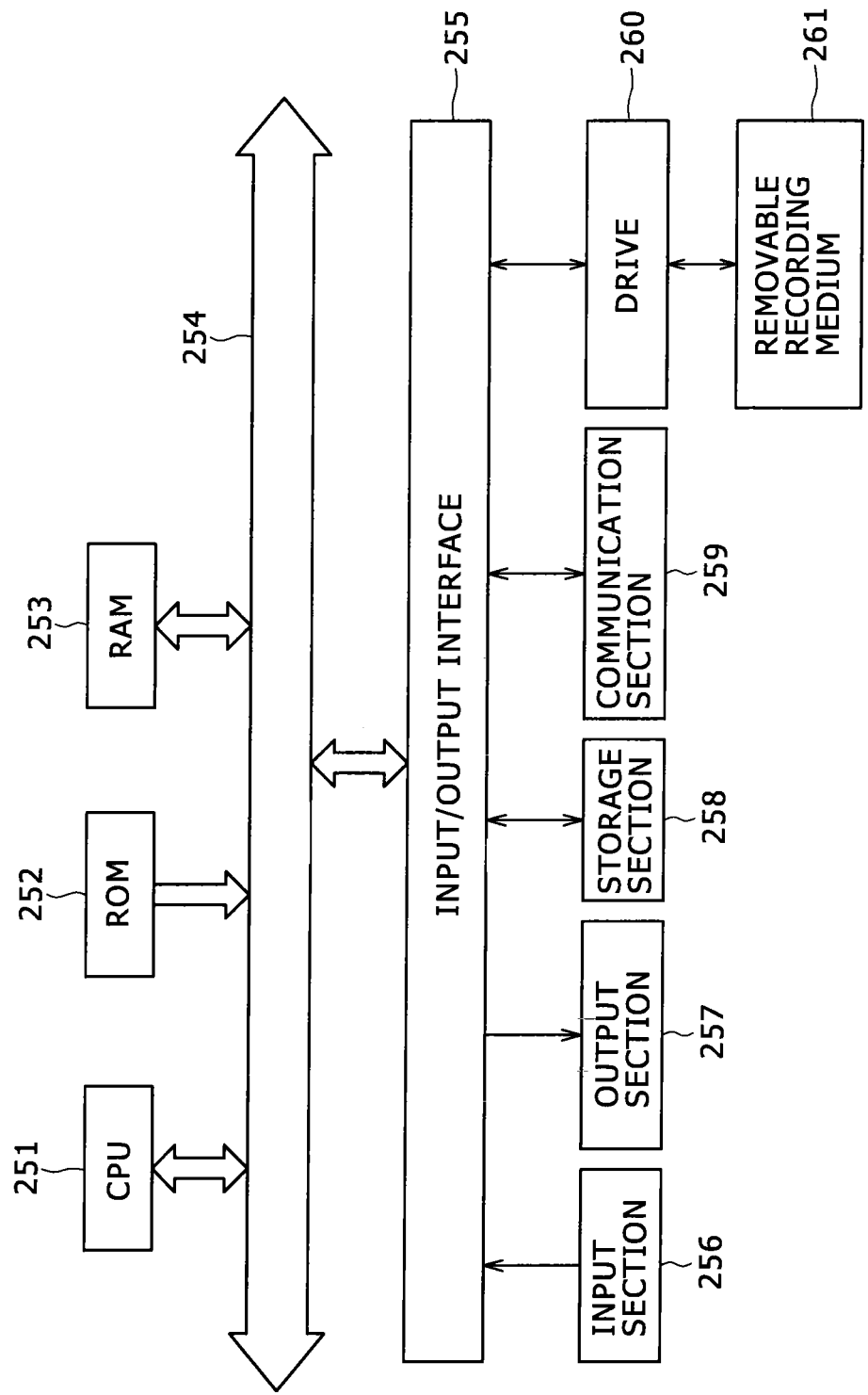
FIG. 19 is a block diagram showing a typical configuration of a computer.

FIG. 19 is a block diagram showing a typical configuration of hardware composing a computer for executing the programs described above in order to carry out every series of processes.

In the computer shown in FIG. 19, a CPU (Central Processing Unit) 251, a ROM (Read Only Memory) 252 and a RAM (Random Access Memory) 253 are connected to each other by a bus 254.

The bus 254 is also connected to an input/output interface 255 which is wired to an input section 256, an output section 257, a storage section 258, a communication section 259 and a drive 260. The input section 256 includes a keyboard and a mouse whereas the output section 257 includes a display unit and a speaker. The storage section 258 is typically a hard disk or a non-volatile memory. The communication section 259 is typically a network interface unit. A removable recording medium 261 is mounted on the drive 260 to be driven by the drive 260.

In the computer having such a configuration, in order to carry out a series of processes, the CPU 251 carries out various kinds of processing by execution of typically programs loaded from the storage section 258 into the RAM 253 through the input/output interface 255 and the bus 254.

The programs to be executed by the CPU 251 are typically programs stored in advance in the removable recording medium 261. As an alternative, the programs are programs downloaded into the computer from a program provider by making use of a wire or radio communication medium. Typical examples of the wire communication medium are a local area network or the Internet whereas a typical example of the radio communication medium is a digital broadcasting communication medium. In this case, the programs downloaded into the computer are installed into the storage section 258.

It is also worth noting that, in the specifications of the present disclosure, the programs include not only programs executed by the computer in order to carry out steps of the flowcharts described above in a pre-prescribed order along the time axis, but also programs which are concurrently or individually executed with demanded timings such timings to activate the steps.

The scope of the present disclosure is by no means limited to the embodiments described above. That is to say, the embodiments implementing the present disclosure can be changed to a variety of implementations within a range not deviating from essentials of the present disclosure.

The present disclosure contains subject matter related to that disclosed in Japanese Priority Patent Application JP 2010-235148 filed in the Japan Patent Office on Oct. 20, 2010, the entire content of which is hereby incorporated by reference.

What is claimed is:

1. A signal receiving apparatus comprising:
a processing unit configured to carry out Fourier transform on Fourier-transform data serving as a Fourier-transform object and carry out Fourier transform on inverse-Fourier-transform data serving as an inverse-Fourier-transform object; and
a control unit configured to output pieces of data obtained as a result of said Fourier transform carried out on said Fourier-transform data in an order, in which said pieces of data have been obtained, in a process of outputting said pieces of data and output other pieces of data obtained as a result of said Fourier transform carried out on said inverse-Fourier transform data by rearranging said other pieces of data in a process of outputting said other pieces of data, wherein
said control unit outputs an mth piece of data obtained as a result of said Fourier transform carried out on said Fourier-transform data as an mth piece of data of a Fourier-transform result composed of said pieces of data and outputs an (N−m)th other piece of data obtained as a result of said Fourier transform carried out on said inverse-Fourier-transform data as an mth piece of data of an inverse-Fourier-transform result composed of said other pieces of data where N is the number of points of said Fourier transform carried out by said processing unit and m is an integer having the following value: m=0, 1, . . . , (N−1).

2. The signal receiving apparatus according to claim 1, said signal receiving apparatus further comprising:
an input storage unit configured to store one of said Fourier-transform data and said inverse-Fourier-transform data; and
an output storage unit configured to store one of data obtained as a result of said Fourier transform carried out on said Fourier-transform data stored in said input storage unit and data obtained as a result of said Fourier transform carried out on said inverse-Fourier-transform data stored in said input storage unit, wherein said control unit outputs said data stored in said output storage unit.

3. The signal receiving apparatus according to claim 1, said signal receiving apparatus further comprising:
a first input storage unit configured to store said Fourier-transform data;
a second input storage unit configured to store said inverse-Fourier-transform data;

a first output storage unit configured to store data obtained as a result of said Fourier transform carried out on said Fourier-transform data stored in said first input storage unit; and a second output storage unit configured to store data obtained as a result of said Fourier transform carried out on said inverse-Fourier-transform data stored in said second input storage unit, wherein said control unit outputs said data stored in one of said first output storage unit and said second output storage unit.

4. The signal receiving apparatus according to claim 1, said signal receiving apparatus further comprising:

a first input storage unit configured to store said Fourier-transform data;

a second input storage unit configured to store said inverse-Fourier-transform data; and an output storage unit configured to store one of data obtained as a result of said Fourier transform carried out on said Fourier-transform data stored in said first input storage unit and store data obtained as a result of said Fourier transform carried out on said inverse-Fourier-transform data stored in said second input storage unit, wherein said control unit outputs said data stored in said output storage unit.

5. The signal receiving apparatus according to claim 1, said signal receiving apparatus further comprising:

an input storage unit configured to store one of said Fourier-transform data and said inverse-Fourier-transform data;

a first output storage unit configured to store data obtained as a result of said Fourier transform carried out on said Fourier-transform data stored in said input storage unit; and a second output storage unit configured to store data obtained as a result of said Fourier transform carried out on said inverse-Fourier-transform data stored in said input storage unit, wherein said control unit outputs said data stored in one of said first output storage unit and said second output storage unit.

6. The signal receiving apparatus according to claim 1, said signal receiving apparatus further comprising:

a storage unit configured to store data selected from said Fourier-transform data, said inverse-Fourier-transform data, data obtained as a result of said Fourier transform carried out on said Fourier-transform data, and data obtained as a result of said Fourier transform carried out on said inverse-Fourier-transform data; and a select unit configured to select one of said Fourier-transform data and said inverse-Fourier-transform data when receiving said Fourier-transform data and said inverse-Fourier-transform data and to store one of said selected Fourier-transform data and said selected inverse-Fourier-transform data in said storage unit, and to select one of said data obtained as a result of said Fourier transform carried out by said processing unit on said Fourier-transform data stored in said storage unit and said data obtained as a result of said Fourier transform carried out by said processing unit on said inverse-Fourier-transform data stored in said storage unit when receiving said data obtained as a result of said Fourier transform carried out on said Fourier-transform data and said data obtained as a result of said Fourier transform carried out on said inverse-Fourier-transform data and to store one of said selected data obtained as a result of said Fourier transform carried out on said Fourier-transform data and said selected data obtained as a result of said Fourier transform carried out on said inverse-Fourier-transform data in said storage unit, wherein said control unit outputs one of said data obtained as a result of said Fourier transform carried out on said Fourier-transform data and said data obtained as a result of said Fourier transform carried out on said inverse-Fourier-transform data by reading out said data to be output from said storage unit.

7. A signal receiving method, said method comprising:

in a processing unit comprising one or more processors and/or circuits;

carrying out Fourier transform on Fourier-transform data serving as a Fourier-transform object and carrying out Fourier transform on inverse-Fourier-transform data serving as an inverse-Fourier-transform object; and outputting pieces of data obtained as a result of said Fourier transform carried out on said Fourier-transform data in an order, in which said pieces of data have been obtained, in a process of outputting said pieces of data and outputting other pieces of data obtained as a result of said Fourier transform carried out on said inverse-Fourier transform data by rearranging said other pieces of data in a process of outputting said other pieces of data, wherein a control unit outputs an mth piece of data obtained as a result of said Fourier transform carried out on said Fourier-transform data as an mth piece of data of a Fourier-transform result composed of said pieces of data and outputs an (N−m)th other piece of data obtained as a result of said Fourier transform carried out on said inverse-Fourier-transform data as an mth piece of data of an inverse-Fourier-transform result composed of said other pieces of data where N is the number of points of said Fourier transform carried out by said processing unit and m is an integer having the following value: m=0, 1, . . . , (N−1).

8. A non-transitory computer readable storage medium having stored thereon, a computer program having at least one code section executable by a computer, thereby causing the computer to perform the steps comprising:

carrying out Fourier transform on Fourier-transform data serving as a Fourier-transform object and carrying out Fourier transform on inverse-Fourier-transform data serving as an inverse-Fourier-transform object; and outputting pieces of data obtained as a result of said Fourier transform carried out on said Fourier-transform data in an order, in which said pieces of data have been obtained, in a process of outputting said pieces of data and outputting other pieces of data obtained as a result of said Fourier transform carried out on said inverse-Fourier transform data by rearranging said other pieces of data in a process of outputting said other pieces of data, wherein a control unit outputs an mth piece of data obtained as a result of said Fourier transform carried out on said Fourier-transform data as an mth piece of data of a Fourier-transform result composed of said pieces of data and outputs an (N−m)th other piece of data obtained as a result of said Fourier transform carried out on said inverse-Fourier-transform data as an mth piece of data of an inverse-Fourier-transform result composed of said other pieces of data where N is the number of points of said Fourier transform carried out by a processing unit and m is an integer having the following value: m=0, 1, . . . , (N−1).

* * * * *